US008892697B2

(12) United States Patent
Nema

(10) Patent No.: US 8,892,697 B2
(45) Date of Patent: Nov. 18, 2014

(54) SYSTEM AND DIGITAL TOKEN FOR PERSONAL IDENTITY VERIFICATION

(75) Inventor: Prashant Nema, San Jose, CA (US)

(73) Assignee: Dhana Systems Corp., San Jose, CA (US)

( * ) Notice: Subject to any disclaimer, the term of this patent is extended or adjusted under 35 U.S.C. 154(b) by 77 days.

(21) Appl. No.: 13/557,142

(22) Filed: Jul. 24, 2012

(65) Prior Publication Data

US 2014/0032723 A1 Jan. 30, 2014

(51) Int. Cl.
*G06F 15/177* (2006.01)
*H04L 29/06* (2006.01)
*H04L 9/32* (2006.01)
*G06F 21/00* (2013.01)

(52) U.S. Cl.
USPC ........... 709/220; 713/159; 713/172; 713/185; 713/186

(58) Field of Classification Search
CPC .............. G06Q 50/01; G06Q 20/4014; G06Q 30/0255; G06Q 20/3672; G06Q 20/40145; H04L 63/105; H04L 9/3231; H04L 63/0861; H04L 67/306; H04L 2209/38; H04L 67/22; G06F 21/32; H04W 12/06
USPC ........................................................ 709/220
See application file for complete search history.

(56) References Cited

U.S. PATENT DOCUMENTS

| | | | |
|---|---|---|---|
| 5,943,423 A | 8/1999 | Muftic | |
| 6,715,674 B2 | 4/2004 | Schneider et al. | |
| 7,089,498 B1 | 8/2006 | Rathjen et al. | |
| 7,330,872 B2 | 2/2008 | Peart et al. | |
| 7,363,494 B2 | 4/2008 | Brainard et al. | |
| 7,502,933 B2 | 3/2009 | Jakobsson et al. | |
| 7,899,753 B1 | 3/2011 | Everhart | |
| 8,009,013 B1 | 8/2011 | Hirschfeld et al. | |
| 8,589,328 B1 * | 11/2013 | Sharma | 706/48 |
| 2005/0154925 A1 * | 7/2005 | Chitrapu et al. | 713/202 |
| 2006/0031174 A1 | 2/2006 | Steinmetz | |
| 2007/0067642 A1 * | 3/2007 | Singhal | 713/186 |
| 2007/0186277 A1 | 8/2007 | Loesch et al. | |
| 2008/0162158 A1 | 7/2008 | Cartmell | |
| 2008/0289020 A1 * | 11/2008 | Cameron et al. | 726/9 |
| 2010/0229223 A1 * | 9/2010 | Shepard et al. | 726/5 |

(Continued)

FOREIGN PATENT DOCUMENTS

| | | | |
|---|---|---|---|
| KR | 10-2011-0054352 A | 5/2011 | |
| WO | 2007073609 A1 | 7/2007 | |
| WO | 2009067248 A1 | 5/2009 | |
| WO | 2010053634 A1 | 5/2010 | |

*Primary Examiner* — Douglas Blair
*Assistant Examiner* — Imran Moorad
(74) *Attorney, Agent, or Firm* — IDP Patent Services; Olav M. Underdal

(57) ABSTRACT

A system and a digital token for user identity verification comprise a control device for communicating over a network. The control device executes program applications and displays outputs to a user. A server communicates over the network to the control device and to other devices. The server comprises a personal identity model, a personal identity engine and a personal identity controller. The personal identity model collects and stores user information comprising personal information, personality, and biometric information. The personal identity engine processes the stored user information to produce the digital token. The personal identity controller manages exchange of the digital token in a user identity verification process. A claim point exchanges the digital token with the server in the user identity verification process in which upon verification the user's identity, the claim point provides a service to the user.

12 Claims, 14 Drawing Sheets

(56) References Cited

U.S. PATENT DOCUMENTS

| | | |
|---|---|---|
| 2010/0250290 A1 | 9/2010 | Lefkowitz et al. |
| 2012/0084078 A1* | 4/2012 | Moganti et al. ............... 704/201 |
| 2012/0216260 A1* | 8/2012 | Crawford et al. ................. 726/5 |
| 2012/0304273 A1* | 11/2012 | Bailey et al. ..................... 726/9 |
| 2013/0227700 A1* | 8/2013 | Dhillon et al. .................. 726/26 |
| 2013/0276087 A1* | 10/2013 | Bjones et al. .................... 726/9 |

* cited by examiner

SYSTEM AND DIGITAL TOKEN FOR PERSONAL IDENTITY VERIFICATION

CROSS-REFERENCE TO RELATED APPLICATIONS

Not applicable.

FEDERALLY SPONSORED RESEARCH OR DEVELOPMENT

Not applicable.

REFERENCE TO SEQUENCE LISTING, A TABLE, OR A COMPUTER LISTING APPENDIX

Not applicable.

COPYRIGHT NOTICE

A portion of the disclosure of this patent document contains material that is subject to copyright protection. The copyright owner has no objection to the facsimile reproduction by anyone of the patent document or patent disclosure as it appears in the Patent and Trademark Office, patent file or records, but otherwise reserves all copyright rights whatsoever.

FIELD OF THE INVENTION

One or more embodiments of the invention generally relate to communication systems. More particularly, one or more embodiments of the invention relate to identification associated with communication systems.

BACKGROUND OF THE INVENTION

The following background information may present examples of specific aspects of the prior art (e.g., without limitation, approaches, facts, or common wisdom) that, while expected to be helpful to further educate the reader as to additional aspects of the prior art, is not to be construed as limiting the present invention, or any embodiments thereof, to anything stated or implied therein or inferred thereupon.

Users of computing systems may need to remember a multiplicity of user identifiers and passwords in order to gain access to the various systems. Billions of dollars are lost or stolen yearly as a result of identity theft and fraud associated with computing systems.

In view of the foregoing, it is clear that these traditional techniques are not perfect and leave room for more optimal approaches.

BRIEF DESCRIPTION OF THE DRAWINGS

The present invention is illustrated by way of example, and not by way of limitation, in the figures of the accompanying drawings and in which like reference numerals refer to similar elements and in which.

Figure 1:
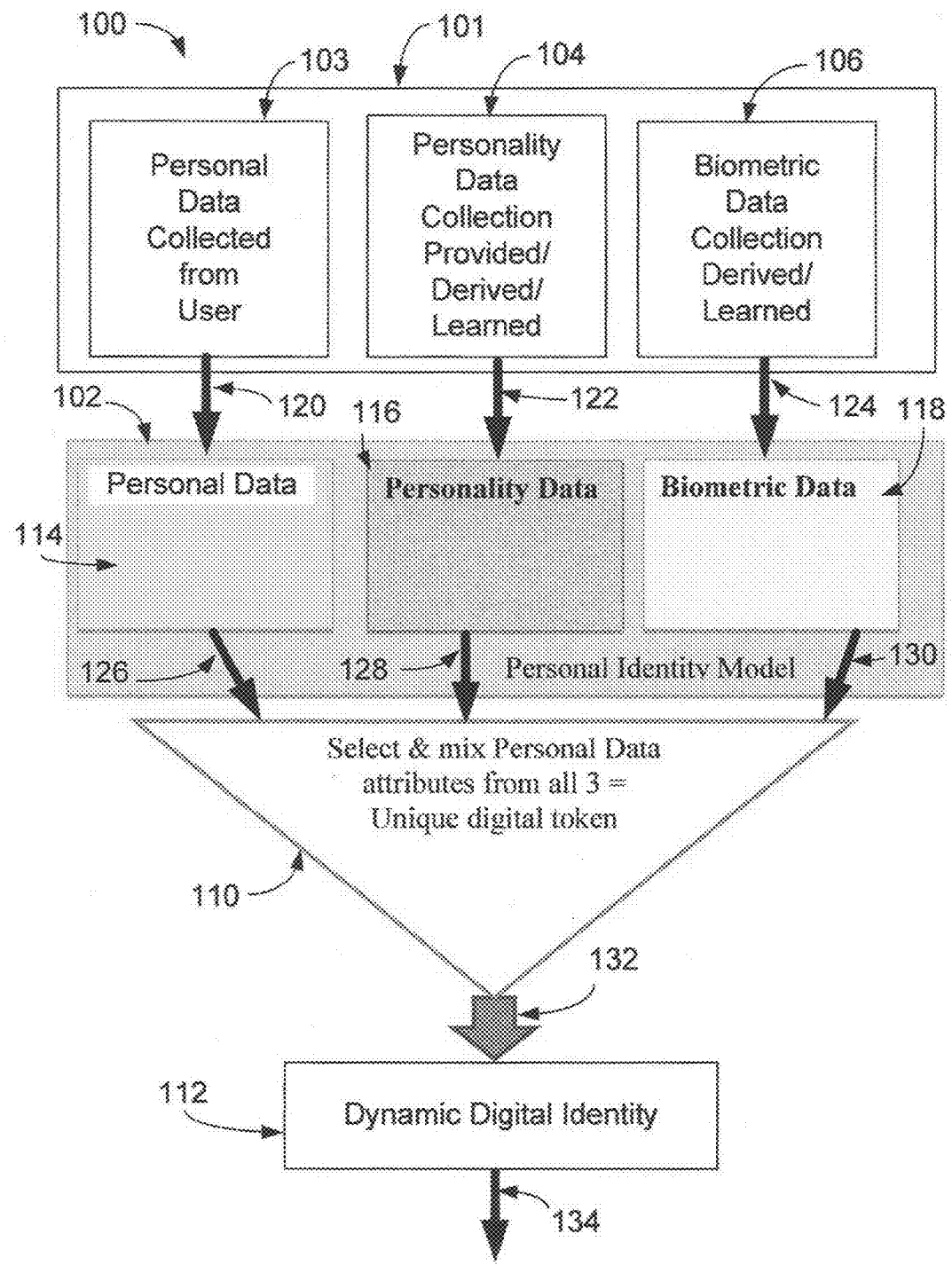
FIG. 1 is a block diagram an example identity system, in accordance with an embodiment of the present invention.

Unless otherwise indicated illustrations in the figures are not necessarily drawn to scale.

DETAILED DESCRIPTION OF SOME EMBODIMENTS

Embodiments of the present invention are best understood by reference to the detailed figures and description set forth herein.

Embodiments of the invention are discussed below with reference to the Figures. However, those skilled in the art will readily appreciate that the detailed description given herein with respect to these figures is for explanatory purposes as the invention extends beyond these limited embodiments. For example, it should be appreciated that those skilled in the art will, in light of the teachings of the present invention, recognize a multiplicity of alternate and suitable approaches, depending upon the needs of the particular application, to implement the functionality of any given detail described herein, beyond the particular implementation choices in the following embodiments described and shown. That is, there are numerous modifications and variations of the invention that are too numerous to be listed but that all fit within the scope of the invention. Also, singular words should be read as plural and vice versa and masculine as feminine and vice versa, where appropriate, and alternative embodiments do not necessarily imply that the two are mutually exclusive.

It is to be further understood that the present invention is not limited to the particular methodology, compounds, materials, manufacturing techniques, uses, and applications, described herein, as these may vary. It is also to be understood that the terminology used herein is used for the purpose of describing particular embodiments only, and is not intended to limit the scope of the present invention. It must be noted that as used herein and in the appended claims, the singular forms "a," "an," and "the" include the plural reference unless the context clearly dictates otherwise. Thus, for example, a reference to "an element" is a reference to one or more elements and includes equivalents thereof known to those skilled in the art. Similarly, for another example, a reference to "a step" or "a means" is a reference to one or more steps or means and may include sub-steps and subservient means. All conjunctions used are to be understood in the most inclusive sense possible. Thus, the word "or" should be understood as having the definition of a logical "or" rather than that of a logical "exclusive or" unless the context clearly necessitates otherwise. Structures described herein are to be understood also to refer to functional equivalents of such structures. Language that may be construed to express approximation should be so understood unless the context clearly dictates otherwise.

Unless defined otherwise, all technical and scientific terms used herein have the same meanings as commonly understood by one of ordinary skill in the art to which this invention belongs. Preferred methods, techniques, devices, and materials are described, although any methods, techniques, devices, or materials similar or equivalent to those described herein may be used in the practice or testing of the present invention. Structures described herein are to be understood also to refer to functional equivalents of such structures. The present invention will now be described in detail with reference to embodiments thereof as illustrated in the accompanying drawings.

From reading the present disclosure, other variations and modifications will be apparent to persons skilled in the art. Such variations and modifications may involve equivalent and other features which are already known in the art, and which may be used instead of or in addition to features already described herein.

Although Claims have been formulated in this application to particular combinations of features, it should be understood that the scope of the disclosure of the present invention also includes any novel feature or any novel combination of features disclosed herein either explicitly or implicitly or any generalization thereof, whether or not it relates to the same invention as presently claimed in any Claim and whether or not it mitigates any or all of the same technical problems as does the present invention.

Features which are described in the context of separate embodiments may also be provided in combination in a single embodiment. Conversely, various features which are, for brevity, described in the context of a single embodiment, may also be provided separately or in any suitable subcombination. The Applicants hereby give notice that new Claims may be formulated to such features and/or combinations of such features during the prosecution of the present application or of any further application derived therefrom.

References to "one embodiment," "an embodiment," "example embodiment," "various embodiments," etc., may indicate that the embodiment(s) of the invention so described may include a particular feature, structure, or characteristic, but not every embodiment necessarily includes the particular feature, structure, or characteristic. Further, repeated use of the phrase "in one embodiment," or "in an exemplary embodiment," do not necessarily refer to the same embodiment, although they may.

As is well known to those skilled in the art many careful considerations and compromises typically must be made when designing for the optimal manufacture of a commercial implementation any system, and in particular, the embodiments of the present invention. A commercial implementation in accordance with the spirit and teachings of the present invention may configured according to the needs of the particular application, whereby any aspect(s), feature(s), function(s), result(s), component(s), approach(es), or step(s) of the teachings related to any described embodiment of the present invention may be suitably omitted, included, adapted, mixed and matched, or improved and/or optimized by those skilled in the art, using their average skills and known techniques, to achieve the desired implementation that addresses the needs of the particular application.

A "computer" may refer to one or more apparatus and/or one or more systems that are capable of accepting a structured input, processing the structured input according to prescribed rules, and producing results of the processing as output. Examples of a computer may include: a computer; a stationary and/or portable computer; a computer having a single processor, multiple processors, or multi-core processors, which may operate in parallel and/or not in parallel; a general purpose computer; a supercomputer; a mainframe; a super mini-computer; a mini-computer; a workstation; a micro-computer; a server; a client; an interactive television; a web appliance; a telecommunications device with internet access; a hybrid combination of a computer and an interactive television; a portable computer; a tablet personal computer (PC); a personal digital assistant (PDA); a portable telephone; application-specific hardware to emulate a computer and/or software, such as, for example, a digital signal processor (DSP), a field-programmable gate array (FPGA), an application specific integrated circuit (ASIC), an application specific instruction-set processor (ASIP), a chip, chips, a system on a chip, or a chip set; a data acquisition device; an optical computer; a quantum computer; a biological computer; and generally, an apparatus that may accept data, process data according to one or more stored software programs, generate results, and typically include input, output, storage, arithmetic, logic, and control units.

"Software" may refer to prescribed rules to operate a computer. Examples of software may include: code segments in one or more computer-readable languages; graphical and or/textual instructions; applets; pre-compiled code; interpreted code; compiled code; and computer programs.

A "computer-readable medium" may refer to any storage device used for storing data accessible by a computer. Examples of a computer-readable medium may include: a magnetic hard disk; a floppy disk; an optical disk, such as a CD-ROM and a DVD; a magnetic tape; a flash memory; a memory chip; and/or other types of media that can store machine-readable instructions thereon.

A "computer system" may refer to a system having one or more computers, where each computer may include a computer-readable medium embodying software to operate the computer or one or more of its components. Examples of a computer system may include: a distributed computer system for processing information via computer systems linked by a network; two or more computer systems connected together via a network for transmitting and/or receiving information between the computer systems; a computer system including two or more processors within a single computer; and one or more apparatuses and/or one or more systems that may accept data, may process data in accordance with one or more stored software programs, may generate results, and typically may include input, output, storage, arithmetic, logic, and control units.

A "network" may refer to a number of computers and associated devices that may be connected by communication facilities. A network may involve permanent connections such as cables or temporary connections such as those made through telephone or other communication links. A network may further include hard-wired connections (e.g., coaxial cable, twisted pair, optical fiber, waveguides, etc.) and/or wireless connections (e.g., radio frequency waveforms, free-space optical waveforms, acoustic waveforms, etc.). Examples of a network may include: an internet, such as the Internet; an intranet; a local area network (LAN); a wide area network (WAN); and a combination of networks, such as an internet and an intranet.

Exemplary networks may operate with any of a number of protocols, such as Internet protocol (IP), asynchronous transfer mode (ATM), and/or synchronous optical network (SONET), user datagram protocol (UDP), IEEE 802.x, near field communication (NFC), Bluetooth™, Wi-Fi™, etc.

Embodiments of the present invention may include apparatuses for performing the operations disclosed herein. An apparatus may be specially constructed for the desired purposes, or it may comprise a general-purpose device selectively activated or reconfigured by a program stored in the device.

Embodiments of the invention may also be implemented in one or a combination of hardware, firmware, and software. They may be implemented as instructions stored on a machine-readable medium, which may be read and executed by a computing platform to perform the operations described herein.

In the following description and claims, the terms "computer program medium" and "computer readable medium" may be used to generally refer to media such as, but not limited to, removable storage drives, a hard disk installed in hard disk drive, and the like. These computer program products may provide software to a computer system. Embodiments of the invention may be directed to such computer program products.

An algorithm is here, and generally, considered to be a self-consistent sequence of acts or operations leading to a desired result. These include physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers or the like. It should be understood, however, that all of these and similar terms are to be associated with the appropriate physical quantities and are merely convenient labels applied to these quantities.

Unless specifically stated otherwise, and as may be apparent from the following description and claims, it should be appreciated that throughout the specification descriptions utilizing terms such as "processing," "computing," "calculating," "determining," or the like, refer to the action and/or processes of a computer or computing system, or similar electronic computing device, that manipulate and/or transform data represented as physical, such as electronic, quantities within the computing system's registers and/or memories into other data similarly represented as physical quantities within the computing system's memories, registers or other such information storage, transmission or display devices.

In a similar manner, the term "processor" may refer to any device or portion of a device that processes electronic data from registers and/or memory to transform that electronic data into other electronic data that may be stored in registers and/or memory. A "computing platform" may comprise one or more processors.

A non-transitory computer readable medium includes, but is not limited to, a hard drive, compact disc, flash memory, volatile memory, random access memory, magnetic memory, optical memory, semiconductor based memory, phase change memory, optical memory, periodically refreshed memory, and the like; however, the non-transitory computer readable medium does not include a pure transitory signal per se.

Identity may be described as the condition of being oneself or itself and not another. A non-limiting example for condition or character as to who a person may be the sense of self, providing sameness and continuity of personality over time. Personal identity may be described as a state of having unique identifying characteristics (behavioral, emotional etc) held by no other person or thing or the set of individual characteristics by which a person is recognized. A comprehensive system to capture, claim and assert a person's unique identity should cater to three aspects—identity given by the world, as in government authority issued identity numbers & documents, identity of physiology, such as, but not limited to, physical or biological, as in visual pictures, DNA, height, weight, hair, color, sex, voice, fingerprints, eyes, etc., and identity of personal and social traits, such as, but not limited to, personality, behavioral or emotional characteristics. An identity system will be described which enables a unique personal identity with means and methods for secure unified personal identification. In some embodiments, a personal identity system may comprise a cloud service and controlling client user devices such as, but not limited to, a smartphone, tablet, PC, etc. Access and control may be managed from the control devices and identity management and generation may be done in the cloud service. In some embodiments, a system enables dynamic creation of personal identity for accessing digital devices and computer systems and for performing secure transactions. Personal identity is based upon given personal, personality and biometric information provided, derived and learned. Non-limiting examples of personal information include name, date of birth, height, favorite color, primary school, weight, phone number, address and email identifier. Non-limiting examples of personality information include information associated with moods, likes, experiences, behaviors, friends from social network access and information from email correspondence. Non-limiting examples of biometric information include fingerprint, voice, photos and retinal scan. In some embodiments, identity system provides dynamic and user controlled creation of personal identification. Personal identification is performed via a dynamically generated one time digital token. The digital token is unique to a user and represents the user's identity. Personal identification is dynamically generated from given personal, personality and biometric information associated with a user. In some embodiments, the Cloud Personal Identity service may comprise three components—Personal Identity Model, Personal Identity Engine and Personal Identity Controller. Personal information is stored in a Personal Identity Model (PIM). The PIM is a unique way to store randomly collected personal information regrouped as core and contextual information. Information in PIM may be extracted for processing systemically based upon core and contextual personal identity. Information associated with user is stored in cloud PIM and processed by personal identity engine (PIE). The PIE is the only component that can access the PIM to process and create personal identity. External access operations are managed by personal identity controller (PIC) associated with the cloud. A federated PIM across various geographic regions may be configured using personal identity engine and personal information controller. Personal identification is performed at its core using the well understood globally "Big 5" Personality traits extraversion, openness, emotional stability, conscientiousness and agreeableness. The Personal identity management Cloud account is setup via a client application on a control computing device. Information is collected via a variety of computing devices. Non-limiting examples of computing devices include smartphone, personal computer, tablet device, netbook computer and notebook computer. The personal identification information may be visually presented via a Graphical User Interface associated with computing device. Once setup and established, Personal identity may be used uniquely for claiming self identity and performing validation on a global basis. The system presents the personal identity as a digital token generated by the Cloud service. The token has a finite life and is created for a certain claim of ones identity and for an intended party only. In some embodiments, Personal Identity Model (PIM) collects information throughout the life of the user, that is directly provided, derived from access to other digital and social networks and learned based on users experiences learnt. The PIM that is the users core and contextual information grouping gets stronger the more it learns about the user. The PIE generates an instance of unique personal digital token on demand based on special logic of selected mixed attributes. The PIE learns and builds unique and secure digital tokens as ever growing data is collected in the PIM. Hence the more you use the identity system the further its invincible. A lost personal identity digital token instance does not give away anything and hence does not compromise a user's identity. Information received and used to create personal identification information is dynamic and processed segregated by PIM, PIE and PIC and hence provides protection from compromise of any part of the system. In some embodiments, a system also enables creation of a ticket associated with personal identification information. The Ticket is a generic pass for a transaction or event in life and may be associated with computing control device. After validating access through personal identity verification, the Ticket may be used in fulfilling a claim or transaction (e.g. movie/event ticket, boarding pass and hotel reservation). There is no one element in the Personal identity solution that can be compromised due to loss, theft or copy of any part of the Personal Identification system i.e. non-limiting list of parts are any control device, application login, PIM access, personality traits, a digital token. Non-limiting examples for application of system include validation of identity associated with Ecommerce, web logins, enterprise and home access, campus access, event/hotel access security, identification with government authorities, secure access to personal property, wi-fi hot spot, public transportation, loyalty programs, mobile wallet and financial transactions The system will now be described in detail with reference to FIGS. 1-11.

FIG. 1 is a block diagram an example identity system, in accordance with an embodiment of the present invention.

An identity system 100 includes an information portion 101, a PIM portion 102, a select/mix portion 110 and a dynamic digital identity portion 112.

Information portion 101 includes a personal information portion 103, a personality information portion 104 and a biometric information portion 106.

PIM portion 102 includes a personal data processing portion 114, a personality data processing portion 116 and a biometric data processing portion 118.

Personal data processing portion 114 receives information from personal information portion 103 via a communication channel 120. Personality data processing portion 116 receives information from personality information portion 104 via a communication channel 122. Biometric data processing portion 118 receives information from biometric information portion 106 via a communication channel 124. Select/mix portion 110 receives information from personal data processing portion 114 via a communication channel 126, from personality data processing portion 116 via a communication channel 128 and from biometric data processing portion via a communication channel 130. Dynamic digital identity portion 112 receives information from select/mix portion 110 via a communication 132.

Identity system 100 enables a user (not shown) to create, manage and claim/present information associated with the user's identity.

Personal information portion 103 receives and collects given information associated with a user. Personality information portion 104 receives and collects information associate with a user's personality. As a non-limiting example, personality information portion 104 may perform learning associated with received and collected personality information from, for example, but not limited to, access to users social networking sites, emails and other internet accounts provided, and this may keep deriving information associated with users personality. Biometric information portion 106 receives and collects biometric information associated from the user. As a non-limiting example, biometric information portion 106 may perform learning associated with received and collected biometric information from multiple additional sources accessed which may help derive additional information associated with received and collected biometric information. PIM portion 102 receives and processes information received from personal information portion 103, personality information portion 104 and biometric information portion 106 in order to generate a systemic personal identity model associated with user. Select/mix portion 110 receives pattern selected information from personal data processing portion 114, personality data processing portion 116 and from biometric data processing portion 118 in order to generate a unique digital token associated with user's identity. Dynamic digital identity portion 112 receives and processes digital token information received from select/mix portion 110 in order to communicate a dynamic digital identity to external entities (not shown).

In operation, personal data is received and collected from user via personal information portion 103, personality data is received and collected associated with user via personality information portion 104, biometric data is received and collected associated with user via biometric information portion 106. Furthermore, PIM portion 102 receives and processes personal data from personal information portion 103, personality data processing portion 116 receives and processed personality data from personality information portion 104 and biometric data processing portion receives and processes biometric data information from biometric information portion 106. Furthermore, select/mix portion 110 receives and processes information from personal data processing portion 114, from personality data processing portion 116 and from biometric data processing portion 118 in order to create a unique digital token associated with user identity. Furthermore, dynamic digital identity portion 112 receives and processes unique digital token information from select/mix portion 110 in order to communicate dynamic digital identification information to external entities.

FIG. 1 is a block diagram an example identity system where personal data, personality data and biometric data are received, collected and processed in order to generate dynamic digital identity information.

Figure 2:
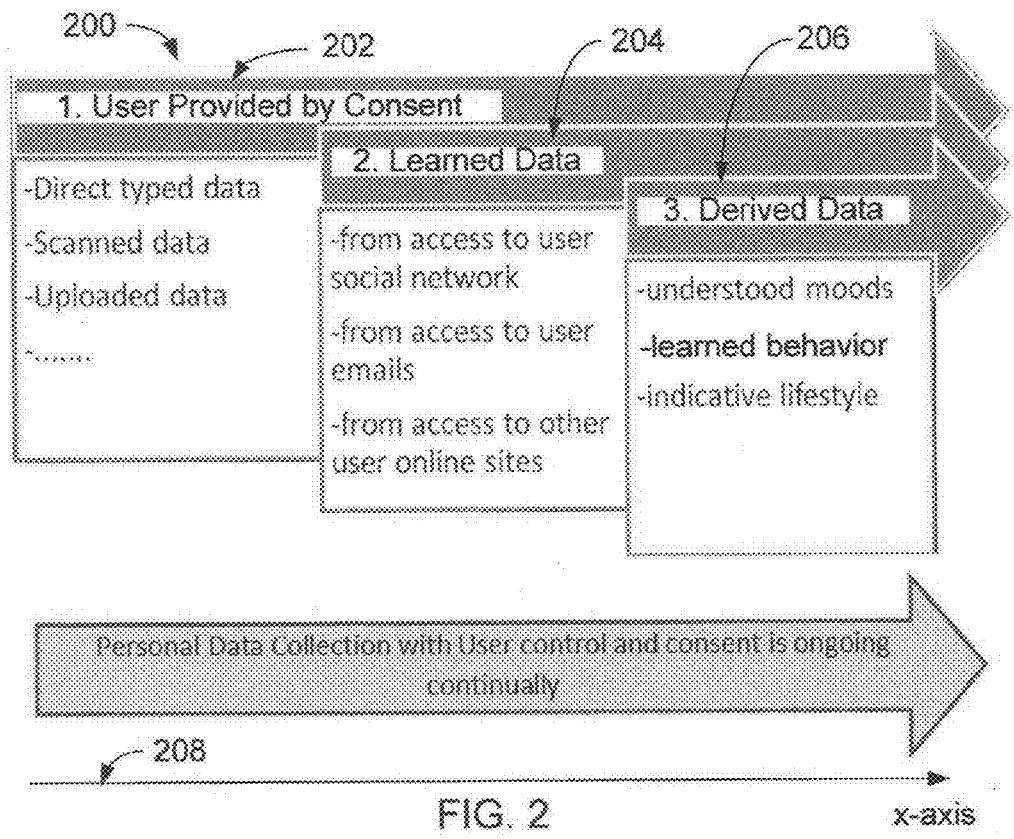
FIG. 2 is a diagram illustrating example of provided/learned/derived personal information and ongoing dynamic identity information associated with identity system as described with reference to FIG. 1, in accordance with an embodiment of the present invention.

FIG. 2 is a diagram illustrating example of provided/learned/derived personal information and dynamic identity information associated with identity system as described with reference to FIG. 1, in accordance with an embodiment of the present invention.

An information diagram 200 includes a user provided information 202, a learned information 204 and a derived information 206. This exemplary diagram shows how across all three personal, personality and biometric data is collected via 3 methods on an ongoing basis. 1. Directly provided by the user such as, but not limited to, punched in, scanned, uploaded etc. 2. Learned by the identity system by accessing the user provided access to social and internet sites. 3. By deriving to conclusions based on user provided and learned data such as, but not limited to, experiences, lifestyle etc.

User provided information 202 represents continually updated information provided by user. Non-limiting examples of user provided information 202 include captured information from keyboard, scanned information and uploaded information. Learned information 204 represents continually updated information learned with respect to user. Non-limiting examples of learned information 204 include social network information, email information and information associated with access of online websites. Derived information 206 represents continually updated information derived from information associated with user. Non-limiting examples of derived information 206 include user responses to stimuli, change in user responses to stimuli over time and user preferences.

User provided information 202, learned information 204 and derived information 206 are continually updated with respect to an x-axis 208 with units of time in increments of nanoseconds. Continual update of information is controlled by user and collected based upon user consent.

FIG. 2 is a diagram illustrating example of provided/learned/derived personal information and dynamic identity information associated with identity system as described with reference to FIG. 1 where provided/learned/derived information is continually updated as configured by user.

Figure 3:
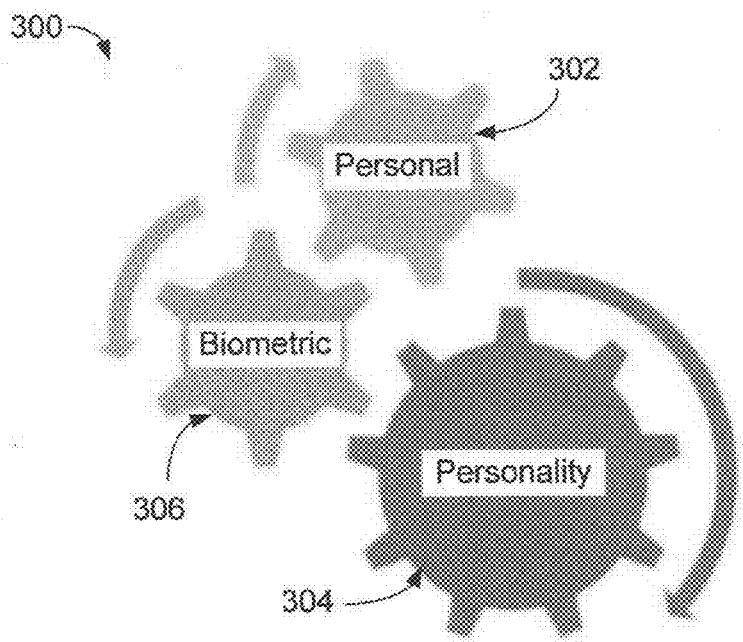
FIG. 3 is a diagram illustrating example of how user provided/learned/derived information is put into three key categories in the PIM as described with reference to FIG. 1, in accordance with an embodiment of the present invention.

FIG. 3 is a diagram illustrating example of how user provided/learned/derived information is put into three key categories in the PIM as described with reference to FIG. 1, in accordance with an embodiment of the present invention.

An information diagram 300 includes a personal information 302, a personality information 304 and a biometric information 306.

Personal information 302 represents personal information received and collected by personal information portion 103 (FIG. 1). Personality information 304 represents personality information received and collected by personality information portion 104 (FIG. 1). Biometric information 306 represents biometric information received and collected by biometric information portion 106 (FIG. 1).

Information diagram 300 represents the processing performed by storing in the PIM portion 102 (FIG. 1) to process personal information 302, personality information 304 and biometric information 306 to continuously create three key categories of dynamic personal information. The diagram shows the interdependency in the three gears and as collected information in one category it will generally enable information for another. Another characteristic is the Personality category is the largest category that over time allows to capture the true unique personal identity. In a non-limiting example, a collected happy party picture for a birthday, may provide personality information of traits (gregariousness) and experiences (enjoyed) and a birthday of personal information of a friend. So as data is collected as in FIG. 2 methods for personality in 304, it may end up changing/updating biometric 306, which may intern end up changing/updating information in personal 302.

FIG. 3 is a diagram illustrating example of how user provided/learned/derived information is put into three key categories in the PIM as described with reference to FIG. 1, in accordance with an embodiment of the present invention.

Figure 4:
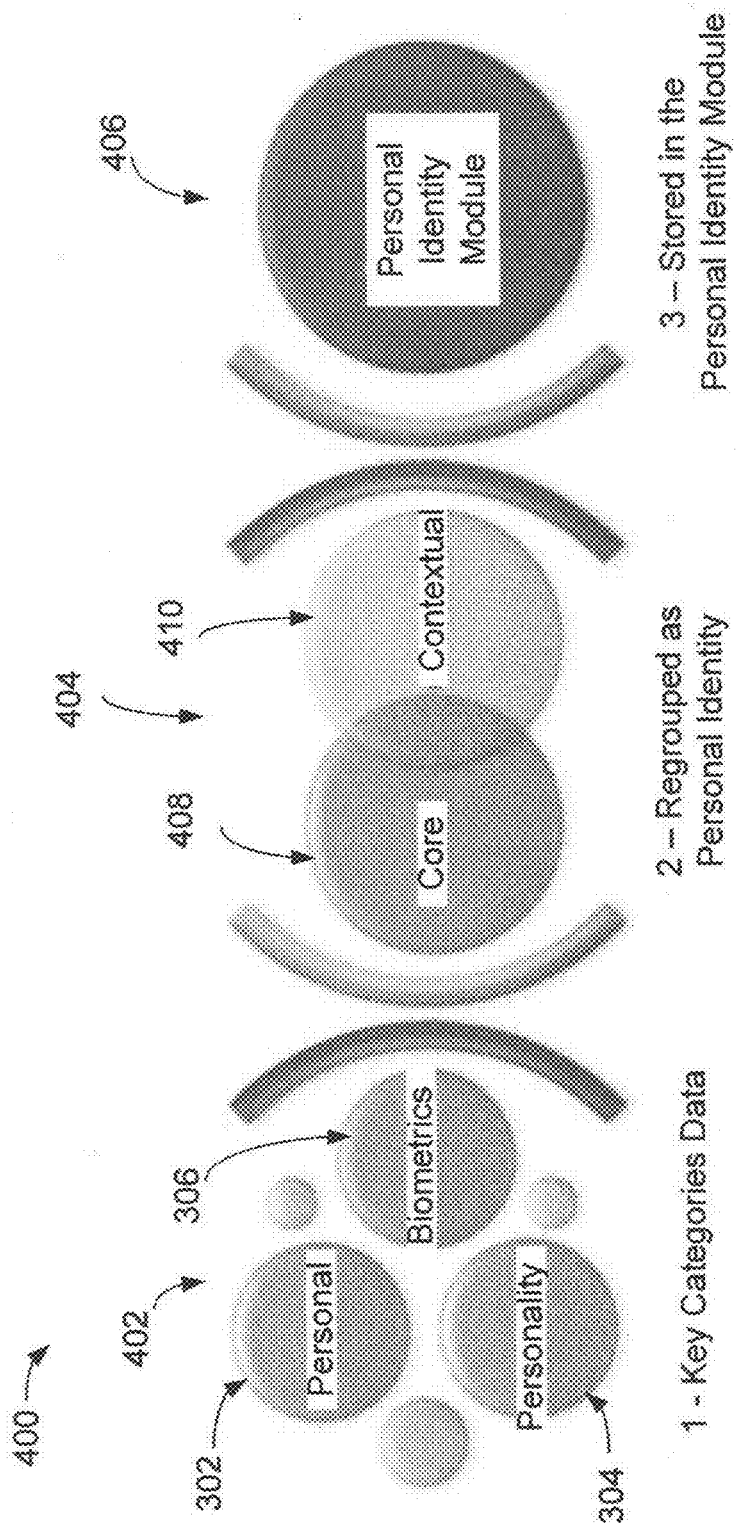
FIG. 4 is a diagram illustrating the example processing of received/collected information with respect to regrouping the information for storage in the personal identity model as described with reference to FIG. 1, in accordance with an embodiment of the present invention.

FIG. 4 is a diagram illustrating the example processing of received/collected information with respect to regrouping the information for storage in the personal identity model as described with reference to FIG. 1, in accordance with an embodiment of the present invention.

A processing diagram 400 includes an information portion 402, a regrouping portion 404 and a personal identity module information 406.

Information portion 402 includes personal information 302 (FIG. 3), personality information 304 (FIG. 3) and biometric information 306 (FIG. 3).

Regrouping portion 404 includes a core information 408 and a contextual information 410.

Information collected about the person in the three categories 302, 304, 306 is regrouped into a different view of Personal Identity in 404, Core 408 and Contextual 410. Personal Identity at instance has its Core (who they are and represent) and context (the surroundings influence on them) for the core. Core information 408 represents core information associated with a user. Non-limiting examples of core information 408 include name, date of birth, fingerprint, primary personality etc, namely principle attributes about the user person (from any of the 3 key categories) that doesn't normally change in any situation. Contextual information 410 represents contextual information associated with a user. Contextual information are evolving or changing, as what we think of our situations affects our behavior, these change rapidly or slowly over time. A person with a core information set has changing contextual traits based on the situation (physical, environmental, time) they are in. Non-limiting examples of contextual information 410 include mood, color, sexual preference, email address, profession, marital status etc namely situational attributes that change or evolve throughout the life of the user based on date, place, companionship, hardships etc. Finally the relational in Personal identity model information 406 represents information associated with PIM portion 102 (FIG. 1).

FIG. 4 is a diagram illustrating the example processing of received/collected information with respect to regrouping the information for storage in the personal identity module as described with reference to FIG. 1 where information is regrouped based upon core and contextual constraints.

Figure 5:
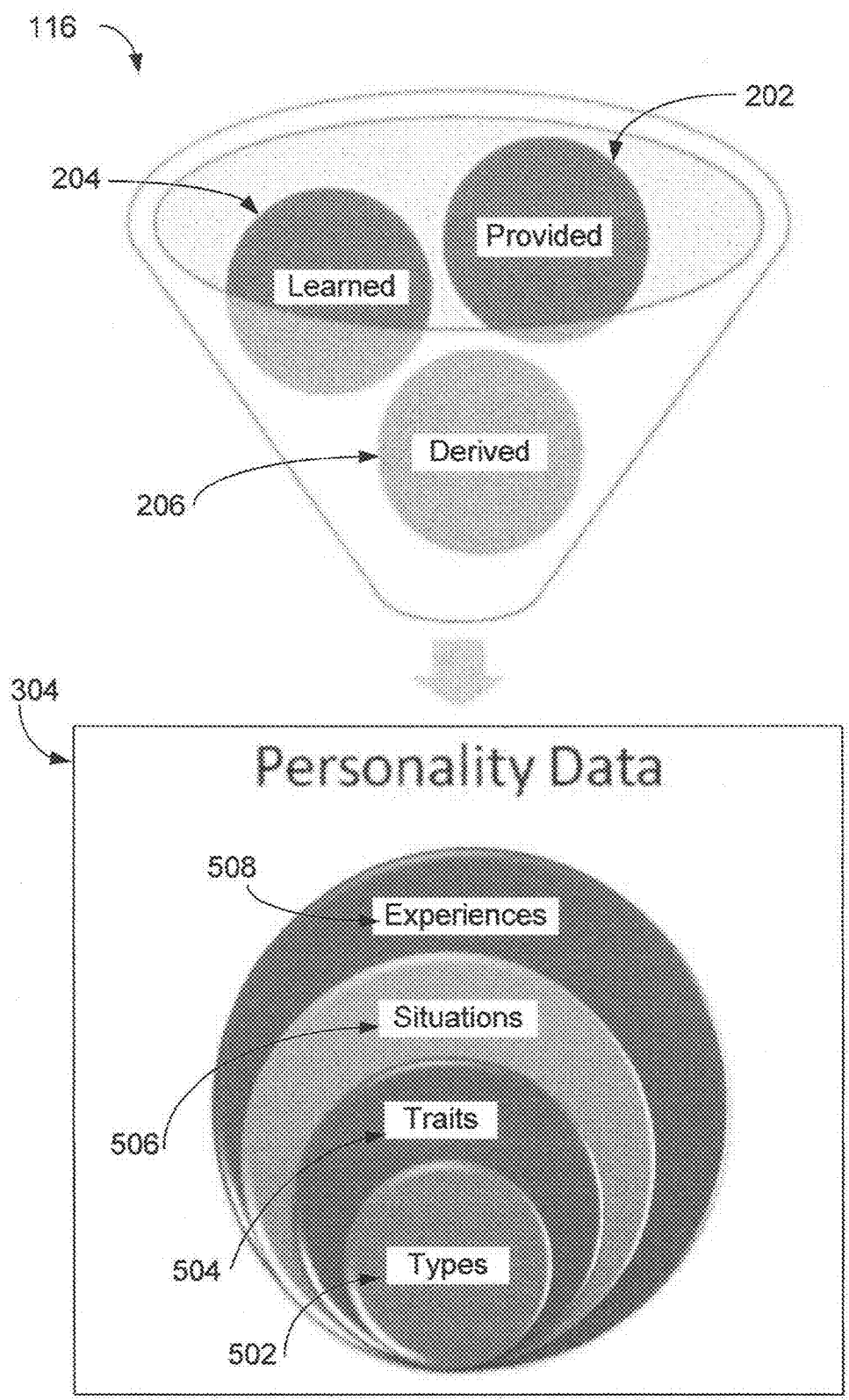
FIG. 5 is a diagram illustrating the example processing of provided, learned and derived information associated with personality as described with reference to FIG. 1, in accordance with an embodiment of the present invention.

FIG. 5 is a diagram illustrating the example processing of provided, learned and derived information associated with personality as described with reference to FIG. 1, in accordance with an embodiment of the present invention.

Personality data processing portion 116 receives and processes user provided information 202, learned information 204 and derived information 206 to generate personality information 304.

Personality information 304 is further processed to segregate received information into a types 502, a traits 504, a situations 506 and an experiences 508. Types 502 represents types associated with the personality of a user. Personality types are a smaller grouping of behaviors that are discontinuous, qualitative and discrete. Personality information collected is used to define and determine the Types. Non-limiting examples of types 502 include four temperaments, Somaotypes, Jungian Types, Myers Briggs, Type A-Type B. Traits 504 represents traits associated with a personality of a user. Traits are a continuous with a degree, sliding scale, and are quantitative amount of characteristics. Personality information collected is used to define and determine ongoing the Traits of the person. Non-limiting examples of traits 504 based on the Big 5 include extraversion, openness, emotional stability (neuroticism), conscientiousness and agreeableness. Situations 506 represents dynamics of situation in which the personality of a user exhibits a certain behaviors (Behavior=personality×interpretation of situation). Non-limiting examples for situations include environments, time, calendar, circumstances etc. Some individuals show more consistent behavior and some traits may emerge in some situations. Personality based on Traits is a strong predictor of behavior across all situations, but is not a strong predictor at a specific time, situation; People display their traits by all that they do, including choice of situations. This method allows to dynamically identify and claim the personal identity more accurately more the identity system is used. Experiences 508 represents the process or fact of observing, undergoing, encountering something and memories of the users feelings and behaviors from them. The identity system allows to collect information and record experiences which help see the interaction between types, traits and situations and determine strongly the personality to assert more strongly the personal identity. Non-limiting examples for experiences 508 include happy, pain, fear, fun, sad, angry, pleasure.

FIG. 5 is a diagram illustrating the example processing of provided, learned and derived information associated with personality as described with reference to FIG. 1 where personality information is further segregated into types, traits, situations and experiences.

Figure 6:
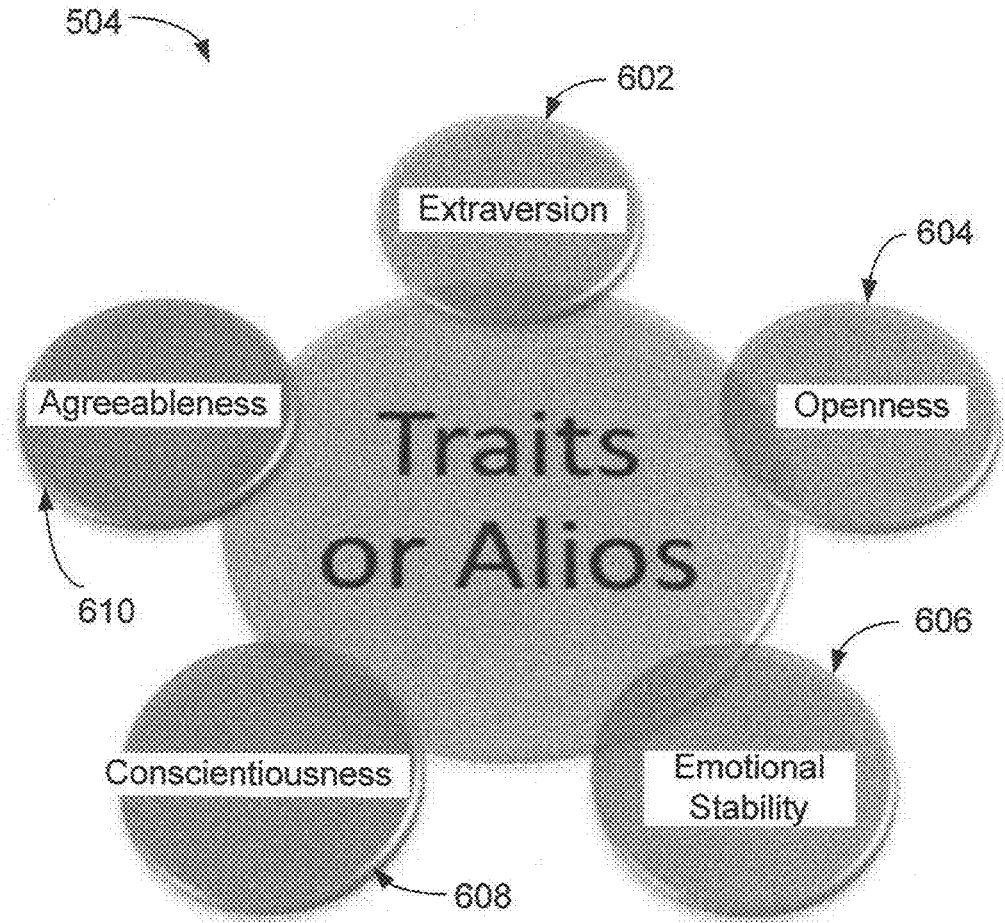
FIG. 6 is a diagram illustrating the example processing of traits/alios information as described with reference to FIG. 5, in accordance with an embodiment of the present invention.

FIG. 6 is a diagram illustrating the example processing of traits/alios information as described with reference to FIG. 5, in accordance with an embodiment of the present invention.

Traits 504 also noted as alios may be further segregated. Non-limiting examples of further segregation for traits 504 include an extraversion information portion 602, an openness information portion 604, an emotional stability information portion 606, a conscientiousness information portion 608 and an agreeableness information portion 610.

Traits 504 represents the "Big Five" factors for Five Factor Model of personality. The factors of personality represent five broad domains or dimensions of personality that are used to describe the human personality.

Extraversion information portion 602 represents information associated with extraverted traits associated with user. Non-limiting examples of extraversion information portion 602 include enthusiasm, assertive and gregarious. Openness information portion 604 represents information associated with openness traits associated with user. Non-limiting examples openness information portion 604 include creativity and open to new experiences. Emotional stability information portion 606 represents information associated with emotional stability. Non-limiting examples of emotional stability information portion 606 include susceptibility to emotional reaction and vulnerability to stress. Conscientiousness information portion 608 represents information associated with conscientiousness. Non-limiting examples for conscientiousness information portion 608 include self-discipline, carefulness, thoroughness, organization and deliberation. Agreeableness information portion 610 represents information associated with agreeableness. Non-limiting examples for agreeableness information portion 610 include trust straightforwardness, altruism, compliance, modesty and tender mindedness.

FIG. 6 is a diagram illustrating the example processing of traits/alios information as described with reference to FIG. 5 where traits or alios are segregated into extraversion, openness, emotional stability, conscientiousness and agreeableness.

Figure 7:
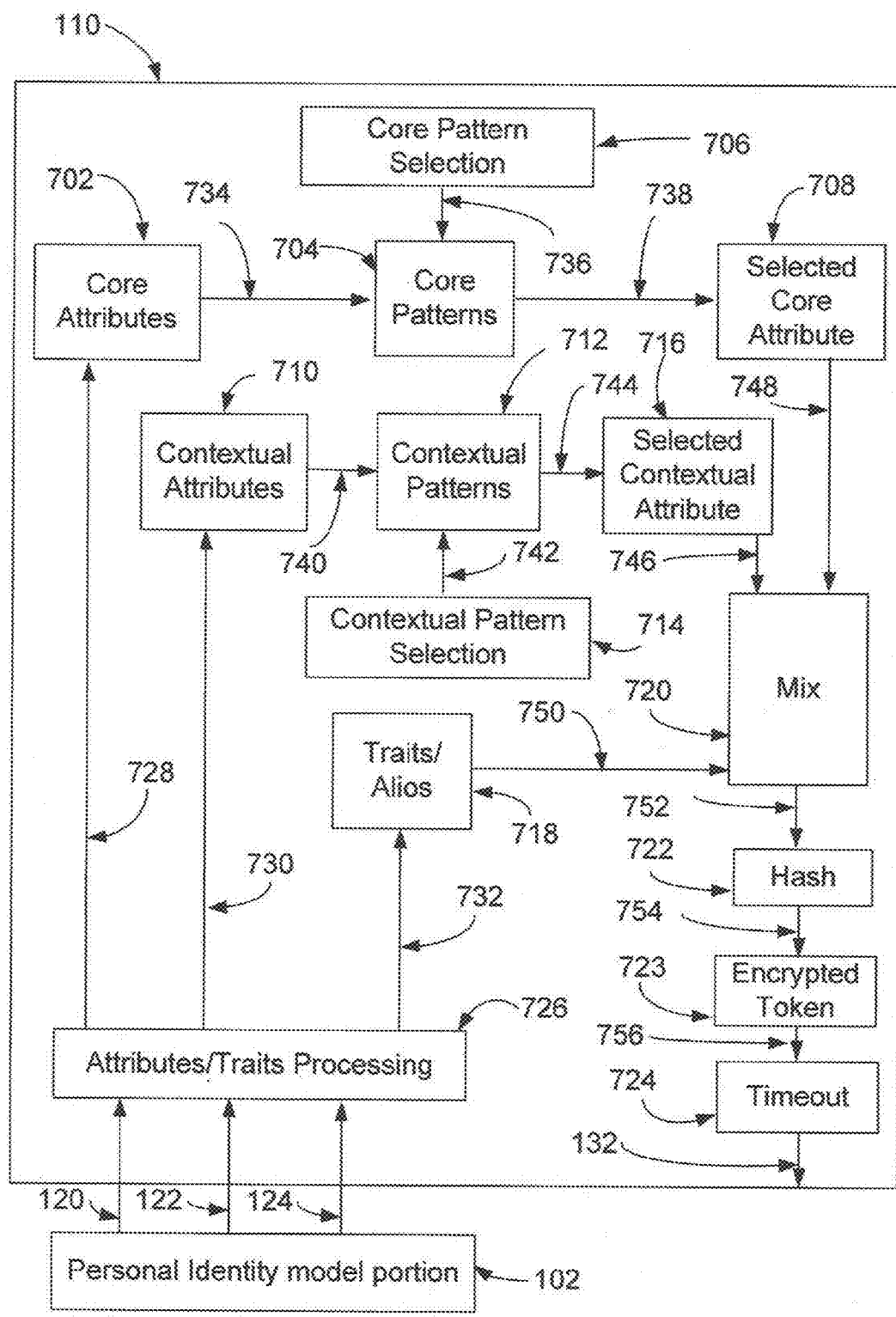
FIG. 7 is a block diagram illustrating alternative embodiments of the example select/mix processing portion as described with reference to FIG. 1, in accordance with an embodiment of the present invention.

FIG. 7 is a block diagram illustrating alternative embodiments of the example select/mix processing portion as described with reference to FIG. 1, in accordance with an embodiment of the present invention.

Select/mix portion 110 as described with reference to FIG. 1 includes a core attributes portion 702, a core patterns portion 704, a core pattern selection portion 706, a selected core attribute portion 708, a contextual attributes portion 710, a contextual patterns portion 712, a contextual pattern selection portion 714, a selected contextual attribute portion 716, a traits/alios portion 718, a mix portion 720, a hash portion 722, an encrypted token portion 723, a timeout portion 724 and an attributes/traits processing portion 726.

Attributes/traits processing portion 726 receives information from PIM portion 102 via communication channels 120, 122 and 124. Core attributes portion 702 receives information from attributes/traits processing portion 726 via a communication channel 728. Contextual attributes portion 710 receives information from attributes/traits processing portion 726 via a communication channel 730. Traits/alios portion 718 receives information from attributes/traits processing portion 726 via a communication channel 732. A random core pattern portion 704 is selected from a core pattern selection portion 706 via a communication channel 736. The selected core pattern 704 is applied to the core attributes in 702 to generate the selected core attributes portion 708 via a communication channel 738. A random contextual pattern portion 712 is selected from a contextual pattern selection portion 714 via a communication channel 742. The selected contextual pattern 712 is applied to the contextual attributes in 710 to generate the selected contextual attributes portion 716 via a communication channel 744. Mix portion 720 receives information from selected contextual attribute portion 716 via a communication channel 746 from selected core attribute portion 708 via a communication channel 748 and from traits/alios portion 718 via a communication channel 750. Mix portion 720 groups all these attributes in a special string of digital data to form a token. Hash portion 722 receives the token from mix portion 720 via a communication channel 752 and encrypts to form an encrypted token. Encrypted token portion 723 receives information from hash portion 722 via a communication channel 754. Encrypted token portion 723 provides a user specific personal identity token externally on request by client/user to the Dynamic Digital identity portion 112 in FIG. 1 via communication channel 132. Timeout portion 724 wakes up on fixed time intervals to flush out (remove) unused personal identity tokens from encrypted token portion 723 via a communication channel 756.

Core attributes portion 702 processes information associated with core information 408 as described with reference to FIG. 4. Core patterns portion 704 applies a pattern or patterns to information received from core attributes portion 702. Core pattern selection portion 706 selects the pattern or patterns to be applied via core patterns portion 704. Selected core attribute portion 708 represents a selected core attribute as processed by core patterns portion 704. Contextual attributes portion 710 processes information associated with contextual information 410 as described with reference to FIG. 4. Contextual patterns portion 712 applies a pattern or patterns to information received from contextual attributes portion 710. Contextual pattern selection portion 714 selects the pattern or patterns to be applied via contextual patterns portion 712. Selected contextual attribute portion 716 represents a selected contextual attribute as processed by contextual patterns portion 712. Attributes/traits processing portion 726 receives traits portion 504 from FIG. 5 from the Personality information of the PIM for the specific user. Each of the 5 traits or alios for the selected user as in FIG. 6 portion 602, 604, 606, 608, 610 is selected in portion 726. Mix portion 720 receives selected core attribute, selected contextual attribute and associated traits/alios and processes the received information to generate an unencrypted token. Hash portion 722 receives an unencrypted token and generates an encrypted token as represented by encrypted token portion 723. Timeout portion 724 receives and deletes unused encrypted token every fixed time interval which triggers generation of a new one all over again by selection of a new set user information into the attributes/traits portion 726 all over again.

In operation, attributes/traits processing portion 726 receives personal, personality and biometric information and processes the information with respect to core, contextual and traits information. Core attributes portion 702 receives information associated with core attributes from attributes/traits processing portion 726. Next a pattern is selected by core patterns portion 704 by a request to the core pattern selection portion 706. This selected pattern in 704 is applied to the received core attributes from 702 with the results of the pattern processing represented by selected core attribute portion 708. Core pattern selector is a smart logic that knows about personal core attributes and their right meaningful combinations. It provides a random pattern that can be applied to select a set of core attributes for a specific user. This process of dynamic pattern selection and application to the core attributes enables a dynamic set of core attributes in the personal identity token. Contextual attributes portion 710 receives information associated with contextual attributes from attributes/traits processing portion 726. Contextual attributes information is received by contextual patterns portion 712 and a pattern or patterns selected by contextual pattern selection portion 714 is applied by contextual patterns portion 712 with the result of the pattern processing represented by selected contextual attribute portion 716. Contextual pattern selector 714 uses a smart logic that knows about the personal contextual attributes and their right meaningful combinations. It provides a random pattern that can be applied to select a set of contextual attributes for a specific user. This way a dynamic set of contextual attributes are always selected for the user's personal identity token. Traits/alios portion 718 receives information from attributes/traits processing portion 726 associated with a specific user as in FIG. 6. Every users personality has a fixed set of Five traits/alios that are collected as described with reference to FIGS. 5-6. These alios are either provided by user directly on the client device or learned/derived from their personality data of behaviors and or experiences. These traits/alios also allow to personalize the personal identity, where besides providing identification the identity will also describe the person as to what kind of person he/she is these days. Mix portion 720 receives selected core attribute information from selected core attribute portion 708, receives selected contextual attribute information from selected contextual attribute portion 716 and receives traits/alios information from traits/alios portion 718 and combines the information to generate unencrypted token information. Hash portion 722 receives the unencrypted token information from mix portion 720 and generates an encrypted token as represented by encrypted token portion 723. Encrypted token portion 723 communicates an encrypted token for performing transactions or identifying a user to external entities.

FIG. 7 is a block diagram illustrating the select/mix processing portion as described with reference to FIG. 1 where personal, personality and biometric information is processed for generating an encrypted token for personal identification.

Figure 8:
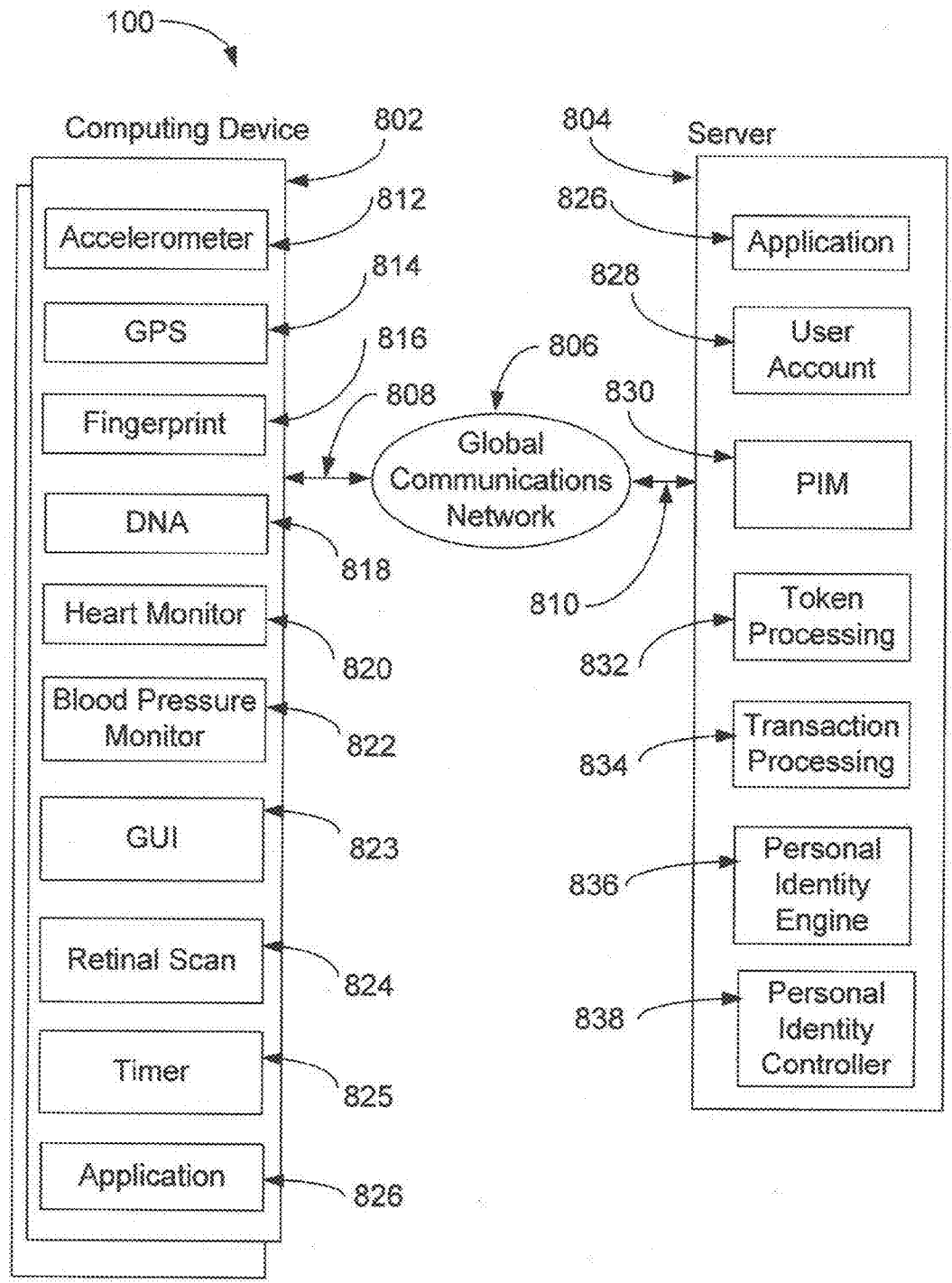
FIG. 8 is a block diagram illustrating alternative embodiments for the example implementation between control (client) device and Cloud Servers of the identity system as described with reference to FIG. 1, in accordance with an embodiment of the present invention.

FIG. 8 is a block diagram illustrating alternative embodiments for the example implementation of the identity system as described with reference to FIG. 1, in accordance with an embodiment of the present invention.

Identity system 100 includes a computing device 802, a server 804 and a global communications network 806.

Global communications network 806 communicates bi-directionally with computing device 802 via a communication channel 808 and with server 804 via a communication channel 810.

Computing device 802 receives, transmits, stores, processes and presents information for viewing. Non-limiting examples for computing device 802 include smartphone, cellular telephone, laptop computer, notebook computer, netbook computer and personal computer. Server 804 receives, transmits, stores and processes information. Global communications network 806 receives, transmits and processes information. As a non-limiting example global communications network 806 may be configures as the Internet.

Computing device 802 includes an accelerometer portion 812, a Global Positioning Satellite (GPS) portion 814, a fingerprint portion 816, a Deoxyribonucleic Acid (DNA) portion 818, a heart monitor portion 820, a blood pressure monitor portion 822, a GUI portion 823, a retinal scan portion 824, a timer portion 825 and an application portion 826.

Accelerometer portion 812 measures and communicates acceleration with respect to computing device 802. GPS portion 814 measures and communicates geographic location information. Fingerprint portion 816 measures and communicates fingerprint information. DNA portion 818 measures and communicates DNA information. Blood pressure monitor portion 822 measures and communicates blood pressure information. GUI portion 823 receives and presents information for viewing. Retinal scan portion 824 measures and communicates information associated with a retinal scan. Timer portion 825 performs processing associated with time keeping and timeouts. Application portion 826 performs executable operations associated with computing device 802. Furthermore, application portion 826 provides for management of personal identity via computing devices.

Server 804 includes application portion 826, a user account portion 828, a PIM portion 830, a token processing portion 832, a transaction processing portion 834, a personal identity engine 836 and a personal identity controller 838.

Application portion 826 is stored on server 804 and is downloaded by computing devices (e.g. computing device 802). User account portion 828 provides storage of information and processing associated with user accounts. PIM portion 830 provides storage of information associated with Personal Identity Model. Token processing portion 832 provides processing associated with tokens. Transaction processing portion 834 provides processing associated with performing transactions. Personal identity engine 836 performs processing associated with personal identification. Personal identity controller 838 manages information associated with personal identification. Personal identity tokens are generated via PIM portion 830 via processing associated with personal identity engine 836. Personal identity controller 838 provides for control and security associated with generating personal identity tokens.

In operation, computing device 802 downloads application portion 826 from server 804 and using application portion 826 to perform operations associated with accelerometer portion 812, GPS portion 814, fingerprint portion 816, DNA portion 818, heart monitor portion 820, blood pressure monitor portion 822, retinal scan portion 824, timer portion 825, user account portion 828, PIM portion 830, token processing portion 832 and transaction processing portion 834.

FIG. 8 is a block diagram illustrating example implementation of the client and server personal identity system as described with reference to FIG. 1 where computing device 802 communicates with a cloud server system 804.

FIGS. 9A-D illustrates an example method for the identification system as described with reference to FIGS. 1-8, in accordance with an embodiment of the present invention.

Figure 9A:
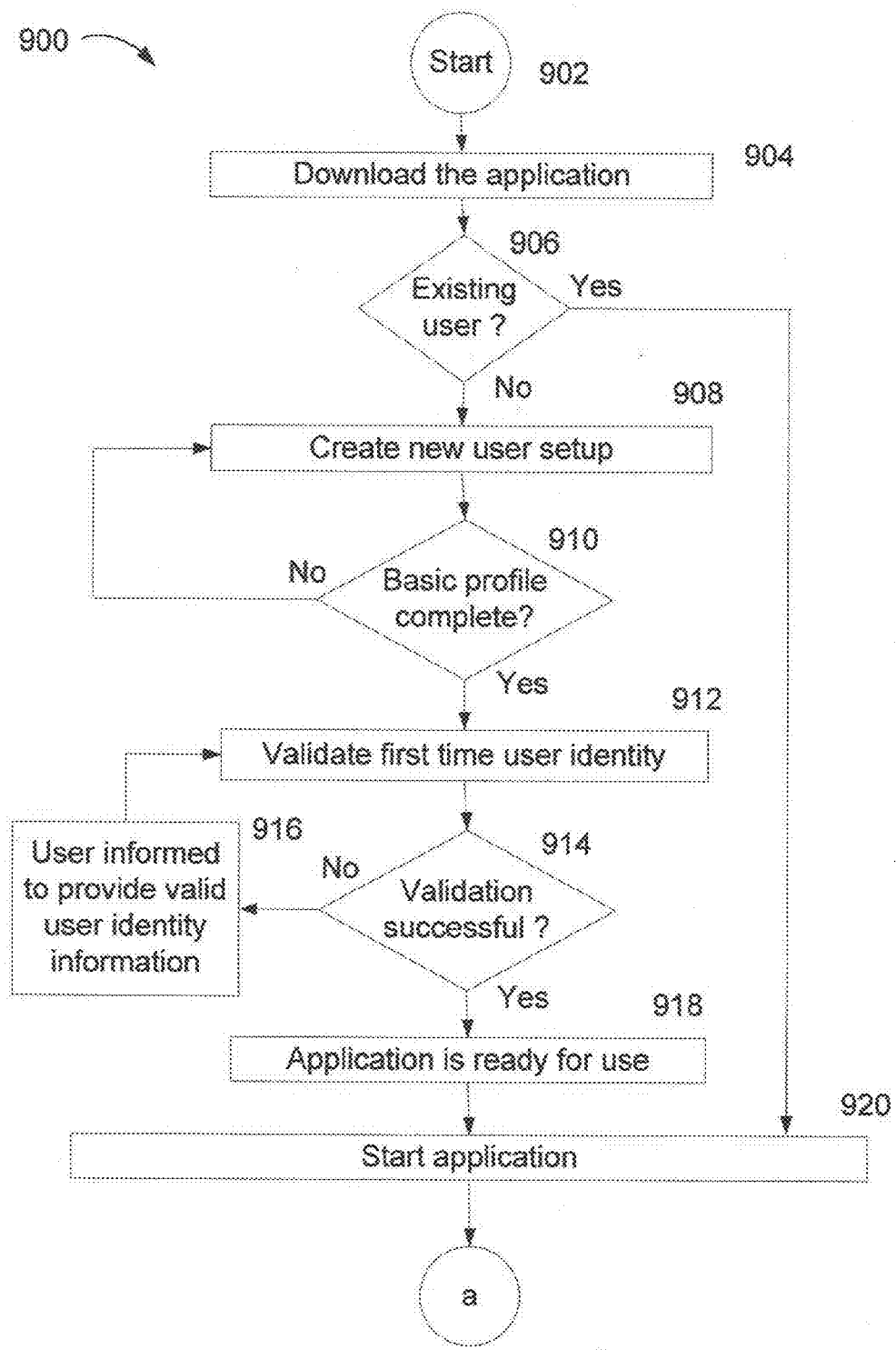
FIGS. 9A-D illustrates an example method for the identification system as described with reference to FIGS. 1-8, in accordance with an embodiment of the present invention.

Referring to FIG. 9A, a method 900 initiates in a step 902.

Then in a step 904, application is downloaded.

As a non-limiting example, computing device 802 (FIG. 8) downloads application portion 826 (FIG. 8) from server 804 (FIG. 8) to computing device 802 (FIG. 8).

Referring back to FIG. 9A, then in a step 906 a determination is performed for an existing user.

As a non-limiting example, computing device 802 (FIG. 8) communicates with user account portion 828 to determine user is an existing user.

Referring back to FIG. 9A, for a determination of not an existing user in step 906, then in a step 908 creation of a new user is performed.

As a non-limiting example, computing device 802 (FIG. 8) receives information from user for creating a new user and with regular communication with user account portion 828 (FIG. 8). Information needed to create a new user basic profile is provided or derived based on user entered on 802.

Referring back to FIG. 9A, then in a step 910 a determination for completion of a basic profile is performed.

As a non-limiting example, computing device 802 (FIG. 8) communicates with user account portion 828 (FIG. 8) for determining if a basic profile has been completed (i.e. to check if minimum level of attributes are assembled in all three categories of personal, personality and biometric).

Referring back to FIG. 9A, for a determination of a complete basic profile in step 910, then in a step 912 first time validation is performed associated with user identity.

As a non-limiting example, computing device 802 (FIG. 8) communicates with user account portion 828 (FIG. 8) to perform a first time validation. This checks 3 things: 1. if the provided set of attributes are sufficient to establish the basic core identity in the PIM of the personal identity system: 2. Uses the attributes to validate the users core identity with 2 external authorities; and 3. Create a sample token.

Referring back to FIG. 9A, then in a step 914 a determination for successful validation is performed.

As a non-limiting example, computing device 802 (FIG. 8) communicates with user account portion 828 (FIG. 8) and determines successful validation.

Referring back to FIG. 9A, for a determination of validation unsuccessful in step 914, then in a step 916 user is informed to provide valid user identity information followed transition of execution of method 900 to step 912.

As a non-limiting example, user is informed via GUI portion 823 (FIG. 8) of computing device 802 (FIG. 8) of unsuccessful validation and requested to provide valid user information.

Referring back to FIG. 9A, for a determination of validation successful in step 914, then in a step 918 application is configured for operation.

As a non-limiting example, computing device 802 (FIG. 8) configures application portion 826 (FIG. 8) for operation.

Referring back to FIG. 9A, for a determination of an existing user in step 906 and following step 918, then in a step 920 operation of application is initiated.

As a non-limiting example, computing device 802 (FIG. 8) initiates operation of application portion 826 (FIG. 8).

Figure 9B:
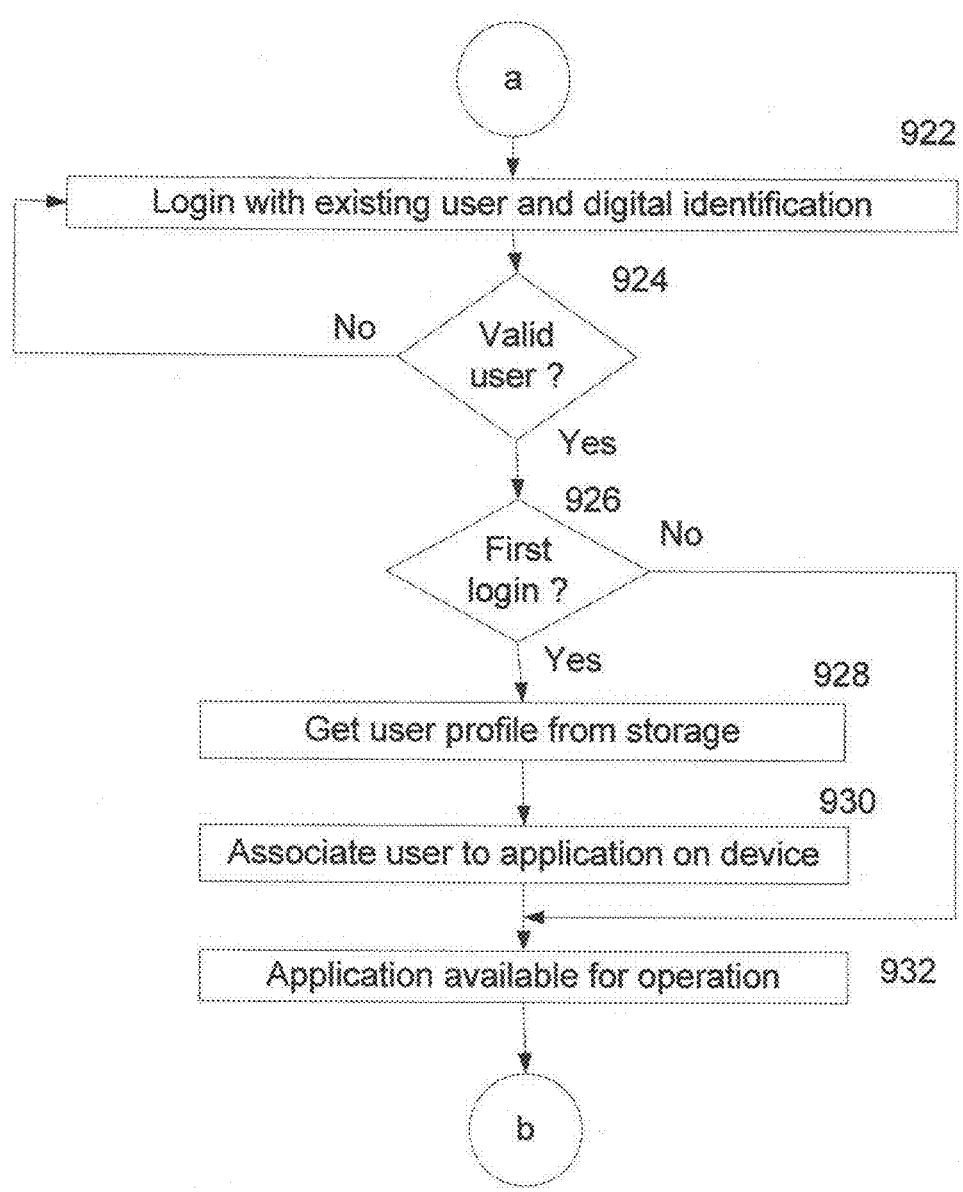

Referring to FIG. 9B, then in a step 922 user accesses system with existing user identification and digital identification.

As a non-limiting example, user, via computing device 802 (FIG. 8), accesses identity system 100, as in 804, using current user identification and digital identification with communication with user account portion 828 (FIG. 8).

Referring back to FIG. 9B, then in a step 924 a determination for a valid user is performed.

As a non-limiting example, a valid user is determined via user account portion 828 (FIG. 8).

Referring back to FIG. 9B, for a determination of an invalid user in step 924 execution of method 900 transitions to step 922.

As a non-limiting example, an invalid user is determined via user account portion 828 (FIG. 8).

Referring back to FIG. 9B, for a determination of a valid user in step 924 then in a step 926 a determination for a user's initial access is performed.

As a non-limiting example, a first-time user is determined via user account portion 828 (FIG. 8).

Referring back to FIG. 9B, for a determination of a user's first access in step 926, then in a step 928 user profile is retrieved.

As a non-limiting example, for a first-time user the user's profile is retrieved via user account portion 828 (FIG. 8).

Referring back to FIG. 9B, then in a step 930 user is associated with application executing on user computing device.

As a non-limiting example, user is associated with application portion 826 (FIG. 8).

Referring back to FIG. 9B, for a determination of not a user's initial access and following step 930, then in a step 932 application is configured for performing transactions.

As a non-limiting example, application portion 826 is configured for performing transactions.

Figure 9C:
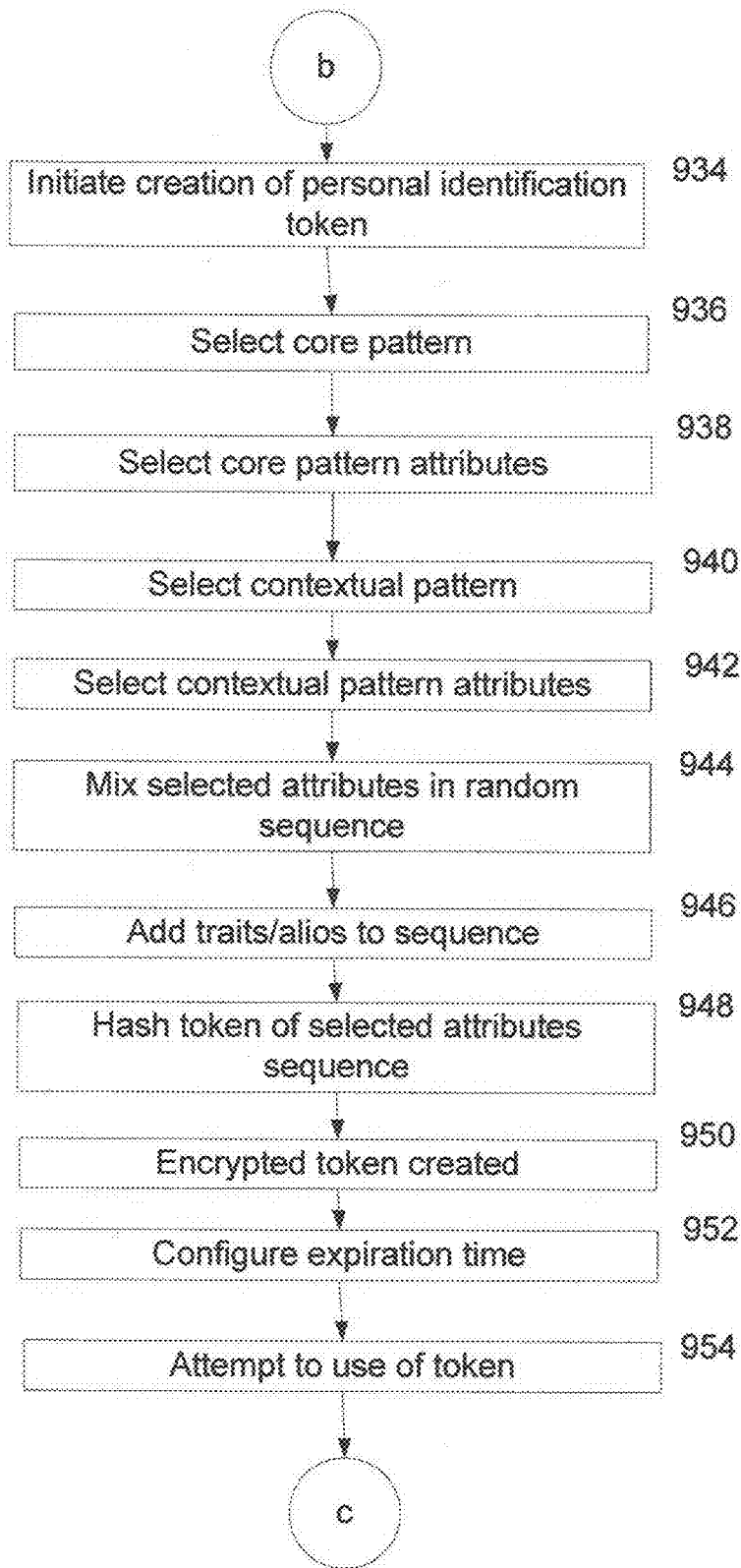

Referring to FIG. 9C, then in a step 934 creation of a personal identification token is initiated.

As a non-limiting example, creation of a personal identification token is initiated via communication with PIM portion 830 (FIG. 8) and token processing portion 832 (FIG. 8).

Referring back to FIG. 9C, then in a step 936 selection of core pattern is performed.

As a non-limiting example, core pattern selection portion 706 (FIG. 7) selects pattern for application and communicates selected pattern to core patterns portion 704 (FIG. 7).

Referring back to FIG. 9C, then in a step 938 core pattern attributes are selected.

As a non-limiting example, core patterns portion 704 (FIG. 7) applies selected pattern to core attributes received from core attributes portion 702 (FIG. 7) with the selected core attributes represented by selected core attribute portion 708 (FIG. 7).

Referring back to FIG. 9C, then in a step 940 contextual pattern is selected.

As a non-limiting example, contextual pattern selection portion 714 (FIG. 7) selects pattern for application and communicates selected pattern to contextual patterns portion 712 (FIG. 7).

Referring back to FIG. 9C, then in a step 942 contextual pattern attributes are selected.

As a non-limiting example, contextual patterns portion 712 (FIG. 7) applies selected pattern to contextual attributes received from contextual attributes portion 710 (FIG. 7) with the selected contextual attributes represented by selected contextual attribute portion 716 (FIG. 7).

Referring back to FIG. 9C, then in a step 944 selected attributes are selected in a random sequence.

As a non-limiting example, mix portion 720 (FIG. 7) receives selected contextual attribute from selected contextual attribute portion 716 (FIG. 7), receives selected core attribute from selected core attribute portion 708 (FIG. 7) and combines in a random sequence.

Referring back to FIG. 9C, then in a step 946 traits/alios are added to sequence.

As a non-limiting example, mix portion 720 (FIG. 7) receives traits/alios from traits/alios portion 718 (FIG. 7) and adds to random core/contextual sequence.

Referring back to FIG. 9C, then in a step 948 hash token of selected attributes sequence is performed.

As a non-limiting example, Hash portion 722 (FIG. 7) receives traits/alios/core/contextual sequence information from mix portion 720 (FIG. 7) and performs a hash of the information.

Referring back to FIG. 9C, then in a step 950 encrypted token is created.

As a non-limiting example, encrypted token portion 723 (FIG. 7) receives hash information from hash portion 722 (FIG. 7) and generates encrypted token.

Referring back to FIG. 9C, then in a step 952 expiration time is configured.

As a non-limiting example, timeout portion 724 (FIG. 7) receives encrypted token from encrypted token portion 723 (FIG. 7) and adds timeout information to form encrypted token with timeout.

Referring back to FIG. 9C, then in a step 954 use of encrypted token is attempted.

As a non-limiting example, computing device 802 (FIG. 8) communicates encrypted token to an entity (not shown) in order to perform a transaction.

Figure 9D:
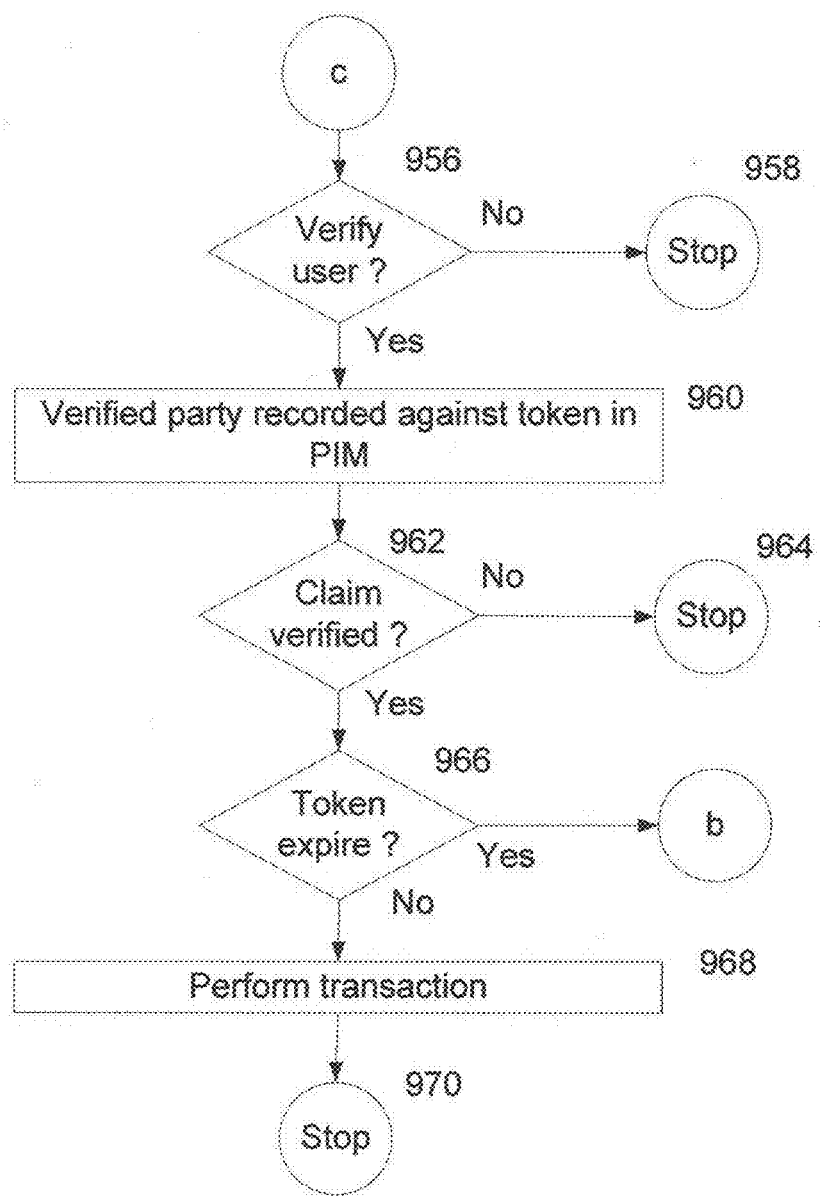

Referring to FIG. 9D, then in a step 956 a determination for a valid user is performed.

As a non-limiting example, external entity performs validation operation associated with user's intended transaction received via transaction processing portion 834 (FIG. 8).

Referring back to FIG. 9D, for a determination of an unverified user in step 956, then in a step 958 execution of method 900 terminates.

Referring back to FIG. 9D, for a determination of a verified user in step 956, then in a step 960 verified party recorded against token associated with PIM.

As a non-limiting example, external entity recorded against token via PIM portion 830 (FIG. 8).

Referring back to FIG. 9D, then in a step 962 a determination for a verified claim is performed.

As a non-limiting example, verification of claim is performed via transaction processing portion 834 (FIG. 8) and via GUI portion 823 (FIG. 8).

Referring back to FIG. 9D, for a determination of an unverified claim in step 962, then in a step 964 execution of method 900 terminates.

Referring back to FIG. 9D, for a determination of a verified claim in step 962, then in a step 966 a determination for an expired token is performed.

As a non-limiting example, a determination for an expired token is performed via token processing portion 832 (FIG. 8).

Referring back to FIG. 9D, for a determination of an expired token in step 966, execution of method 900 transitions to step 934 (FIG. 9C).

Referring back to FIG. 9D, for a determination of an unexpired token in step 966, then in a step 968 transaction is performed.

As a non-limiting example, transaction between computing device 802 and external entity is performed via transaction processing portion 834 (FIG. 8).

Referring back to FIG. 9D, then in a step 970 execution of method 900 terminates.

FIGS. 9A-D illustrates an example method for the identification system as described with reference to FIGS. 1-8 where an application is downloaded, new user created if needed, basic profile generated, first time validation is performed, application is configured for use, application is initiated, access is granted, user validity is performed, checking for first time access is performed, user profile retrieved from storage, user and application are associated, application made available for operation, token creation initiated, core pattern selected, core pattern attributes selected, contextual pattern selected, contextual pattern attributes selected, attributes randomly mixed in a sequence, traits/alios added to sequence, unencrypted token hashed, encrypted token created, expiration time created for encrypted token, use of token initiated, user verification performed, party recorded against token in PIM, verification of claim performed, verification of token timeout performed and transaction is performed.

Figure 9E:
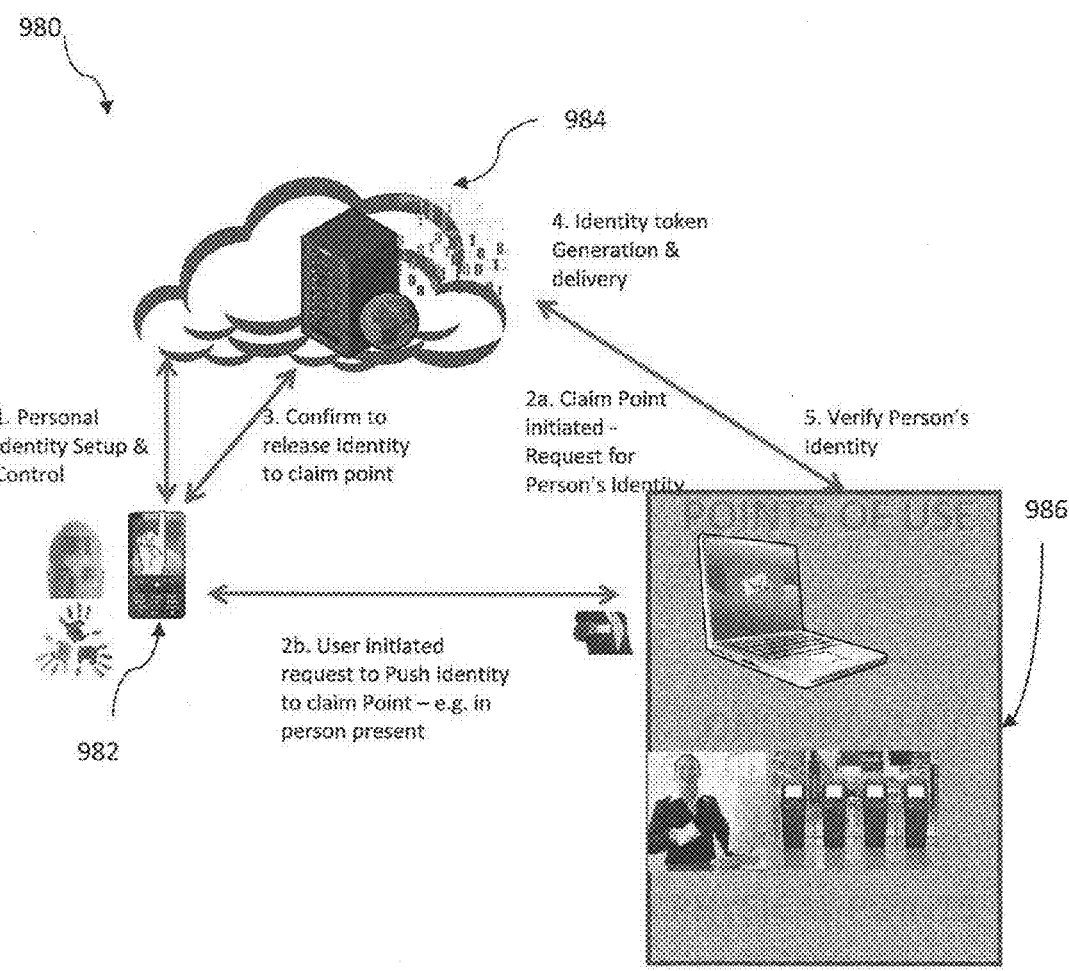
FIG. 9E is an exemplary block diagram illustrating interaction between Control device, Cloud Service and Claim points, in accordance with an embodiment of the present invention.

FIG. 9E is an exemplary block diagram illustrating interaction between Control device, Cloud Service and Claim points, in accordance with an embodiment of the present invention.

A block diagram 980 includes a control device 982, a cloud service 984 and claims points 986.

Control device 982 receives, transmits, stores, processes and presents information for viewing. Non-limiting examples for control device 982 include smartphone, cellular telephone, laptop computer, notebook computer, netbook computer and personal computer. Cloud service 984 receives, transmits, stores and processes information. Claims points 986 provide services to a user of control device 982.

In operation, a request for personal identity to cloud service 984 may come from a claim point service provider in claims points 986 to authenticate a user. Non-limiting examples of a claim point service provider may include a web site, or by a terminal machine at check-in at airport, etc. A request for personal identity to cloud service 984 may also be initiated by the user themselves to physically present personal identification such as, but not limited to, at check-in to hotel or security gate at airport. All requests for identification are routed to the cloud service identity system 984 which in turn sends a request to confirm to a client application on the control device 982. The user confirms from the control device 982 the release of personal identity to cloud identity service 984, which then releases a Dynamic digital identity token (as detailed in FIG. 7). A fresh user token encrypted with the requesting party (claim point) identification is delivered or sent to the claim point 986. A new token is generated if the last one is either expired or not for the same claim party. When the claim point 986 receives the user's identity (as an encrypted token), claim point 986 will want or need to verify the user is the real person, for which the claim point 986 requests for verification of the identity to cloud service 984 by sending back the token. Cloud service 984 receives the verification request and validates token, and cross checks both parties and returns back an identity confirmation. Non-limiting examples of identity confirmation may include name, address, picture, or special tickets stored etc. If the cloud service 984 doesn't receive request for verification in a fixed time it will expire the issued token and any request for verification from claim point will be rejected.

Figure 10:
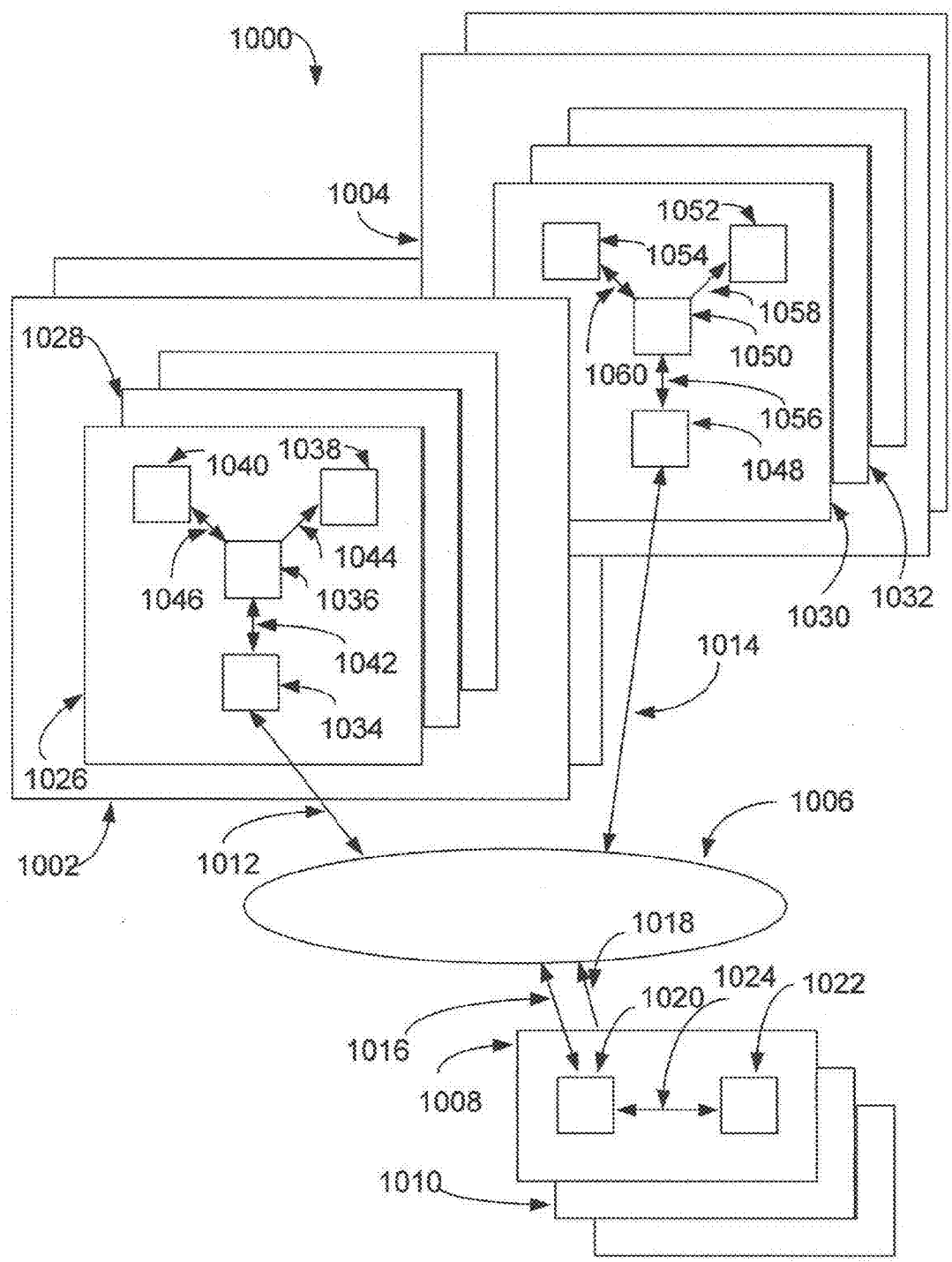
FIG. 10 illustrates a block diagram depicting a conventional client/server communication system.

FIG. 10 illustrates a block diagram depicting a conventional client/server communication system.

A communication system 1000 includes a multiplicity of networked regions with a sampling of regions denoted as a network region 1002 and a network region 1004, a global network 1006 and a multiplicity of servers with a sampling of servers denoted as a server device 1008 and a server device 1010.

Network region 1002 and network region 1004 may operate to represent a network contained within a geographical area or region. Non-limiting examples of representations for the geographical areas for the networked regions may include postal zip codes, telephone area codes, states, counties, cities and countries. Elements within network region 1002 and 1004 may operate to communicate with external elements within other networked regions or within elements contained within the same network region.

In some implementations, global network 1006 may operate as the Internet. It will be understood by those skilled in the art that communication system 1000 may take many different forms. Non-limiting examples of forms for communication system 1000 include local area networks (LANs), wide area networks (WANs), wired telephone networks, cellular telephone networks or any other network supporting data communication between respective entities via hardwired or wireless communication networks. Global network 1006 may operate to transfer information between the various networked elements.

Server device 1008 and server device 1010 may operate to execute software instructions, store information, support database operations and communicate with other networked elements. Non-limiting examples of software and scripting languages which may be executed on server device 1008 and server device 1010 include C, C++, C# and Java.

Network region 1002 may operate to communicate bi-directionally with global network 1006 via a communication channel 1012. Network region 1004 may operate to communicate bi-directionally with global network 1006 via a communication channel 1014. Server device 1008 may operate to communicate bi-directionally with global network 1006 via a communication channel 1016. Server device 1010 may operate to communicate bi-directionally with global network 1006 via a communication channel 1018. Network region 1002 and 1004, global network 1006 and server devices 1008 and 1010 may operate to communicate bi-directionally and also communicate bi-directionally with other networked device located within communication system 1000.

Server device 1008 includes a networking device 1020 and a server 1022. Networking device 1020 may operate to communicate bi-directionally with global network 1006 via communication channel 1016 and with server 1022 via a communication channel 1024. Server 1022 may operate to execute software instructions and store information.

Network region 1002 includes a multiplicity of clients with a sampling denoted as a client 1026 and a client 1028. Client 1026 includes a networking device 1034, a processor 1036, a GUI 1038 and an interface device 1040. Non-limiting examples of devices for GUI 1038 include monitors, televisions, cellular telephones, smartphones and PDAs (Personal Digital Assistants). Non-limiting examples of interface device 1040 include pointing device, mouse, trackball, scanner and printer. Networking device 1034 may communicate bi-directionally with global network 1006 via communication channel 1012 and with processor 1036 via a communication channel 1042. GUI 1038 may receive information from processor 1036 via a communication channel 1044 for presentation to a user for viewing. Interface device 1040 may operate to send control information to processor 1036 and to receive information from processor 1036 via a communication channel 1046. Network region 1004 includes a multiplicity of clients with a sampling denoted as a client 1030 and a client 1032. Client 1030 includes a networking device 1048, a processor 1050, a GUI 1052 and an interface device 1054. Non-limiting examples of devices for GUI 1038 include monitors, televisions, cellular telephones, smartphones and PDAs (Personal Digital Assistants). Non-limiting examples of interface device 1040 include pointing devices, mousse, trackballs, scanners and printers. Networking device 1048 may communicate bi-directionally with global network 1006 via communication channel 1014 and with processor 1050 via a communication channel 1056. GUI 1052 may receive information from processor 1050 via a communication channel 1058 for presentation to a user for viewing. Interface device 1054 may operate to send control information to processor 1050 and to receive information from processor 1050 via a communication channel 1060.

For example, consider the case where a user interfacing with client 1026 may want to execute a networked application. A user may enter the IP (Internet Protocol) address for the networked application using interface device 1040. The IP address information may be communicated to processor 1036 via communication channel 1046. Processor 1036 may then communicate the IP address information to networking device 1034 via communication channel 1042. Networking device 1034 may then communicate the IP address information to global network 1006 via communication channel 1012. Global network 1006 may then communicate the IP address information to networking device 1020 of server device 1008 via communication channel 1016. Networking device 1020 may then communicate the IP address information to server 1022 via communication channel 1024. Server 1022 may receive the IP address information and after processing the IP address information may communicate return information to networking device 1020 via communication channel 1024. Networking device 1020 may communicate the return information to global network 1006 via communication channel 1016. Global network 1006 may communicate the return information to networking device 1034 via communication channel 1012. Networking device 1034 may communicate the return information to processor 1036 via communication channel 1042. Processor 1036 may communicate the return information to GUI 1038 via communication channel 1044. User may then view the return information on GUI 1038.

Figure 11:
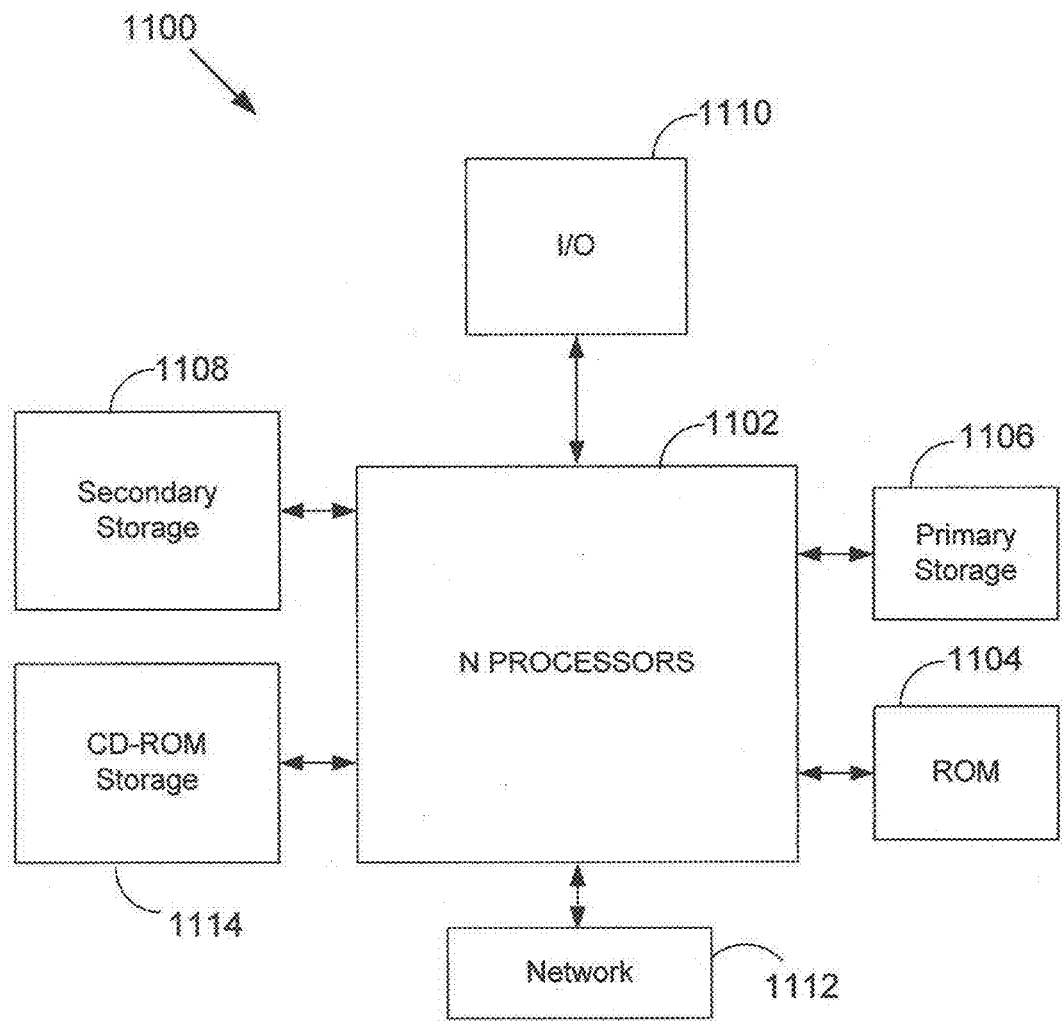
FIG. 11 illustrates a typical computer system that, when appropriately configured or designed, may serve as a computer system for which the present invention may be embodied.

FIG. 11 illustrates a typical computer system that, when appropriately configured or designed, may serve as a computer system 1100 for which the present invention may be embodied.

Computer system 1100 includes a quantity of processors 1102 (also referred to as central processing units, or CPUs) that may be coupled to storage devices including a primary storage 1106 (typically a random access memory, or RAM), a primary storage 1104 (typically a read-only memory, or ROM). CPU 1102 may be of various types including microcontrollers (e.g., with embedded RAM/ROM) and microprocessors such as programmable devices (e.g., RISC or SISC based, or CPLDs and FPGAs) and devices not capable of being programmed such as gate array ASICs (Application Specific Integrated Circuits) or general purpose microprocessors. As is well known in the art, primary storage 1104 acts to transfer data and instructions uni-directionally to the CPU and primary storage 1106 typically may be used to transfer data and instructions in a bi-directional manner. The primary storage devices discussed previously may include any suitable computer-readable media such as those described above. A mass storage device 1108 may also be coupled bi-directionally to CPU 1102 and provides additional data storage capacity and may include any of the computer-readable media described above. Mass storage device 1108 may be used to store programs, data and the like and typically may be used as a secondary storage medium such as a hard disk. It will be appreciated that the information retained within mass storage device 1108, may, in appropriate cases, be incorporated in standard fashion as part of primary storage 1106 as virtual memory. A specific mass storage device such as a CD-ROM 1114 may also pass data uni-directionally to the CPU.

CPU 1102 may also be coupled to an interface 1110 that connects to one or more input/output devices such as such as video monitors, track balls, mice, keyboards, microphones, touch-sensitive displays, transducer card readers, magnetic or paper tape readers, tablets, styluses, voice or handwriting recognizers, or other well-known input devices such as, of course, other computers. Finally, CPU 1102 optionally may be coupled to an external device such as a database or a computer or telecommunications or internet network using an external connection shown generally as a network 1112, which may be implemented as a hardwired or wireless communications link using suitable conventional technologies. With such a connection, the CPU might receive information from the network, or might output information to the network in the course of performing the method steps described in the teachings of the present invention.

Those skilled in the art will readily recognize, in light of and in accordance with the teachings of the present invention, that any of the foregoing steps and/or system modules may be suitably replaced, reordered, removed and additional steps and/or system modules may be inserted depending upon the needs of the particular application, and that the systems of the foregoing embodiments may be implemented using any of a wide variety of suitable processes and system modules, and is not limited to any particular computer hardware, software, middleware, firmware, microcode and the like. For any method steps described in the present application that can be carried out on a computing machine, a typical computer system can, when appropriately configured or designed, serve as a computer system in which those aspects of the invention may be embodied.

It will be further apparent to those skilled in the art that at least a portion of the novel method steps and/or system components of the present invention may be practiced and/or located in location(s) possibly outside the jurisdiction of the United States of America (USA), whereby it will be accordingly readily recognized that at least a subset of the novel method steps and/or system components in the foregoing embodiments must be practiced within the jurisdiction of the USA for the benefit of an entity therein or to achieve an object of the present invention. Thus, some alternate embodiments of the present invention may be configured to comprise a smaller subset of the foregoing means for and/or steps described that the applications designer will selectively decide, depending upon the practical considerations of the particular implementation, to carry out and/or locate within the jurisdiction of the USA. For example, any of the foregoing described method steps and/or system components which may be performed remotely over a network (e.g., without limitation, a remotely located server) may be performed and/or located outside of the jurisdiction of the USA while the remaining method steps and/or system components (e.g., without limitation, a locally located client) of the forgoing embodiments are typically required to be located/performed in the USA for practical considerations. In client-server architectures, a remotely located server typically generates and transmits required information to a US based client, for use according to the teachings of the present invention. Depending upon the needs of the particular application, it will be readily apparent to those skilled in the art, in light of the teachings of the present invention, which aspects of the present invention can or should be located locally and which can or should be located remotely. Thus, for any claims construction of the following claim limitations that are construed under 35 USC §112 (6) it is intended that the corresponding means for and/or steps for carrying out the claimed function are the ones that are locally implemented within the jurisdiction of the USA, while the remaining aspect(s) performed or located remotely outside the USA are not intended to be construed under 35 USC §112 (6). In some embodiments, the methods and/or system components which may be located and/or performed remotely include, without limitation: servers and global communication network.

It is noted that according to USA law, all claims must be set forth as a coherent, cooperating set of limitations that work in functional combination to achieve a useful result as a whole. Accordingly, for any claim having functional limitations interpreted under 35 USC §112 (6) where the embodiment in question is implemented as a client-server system with a remote server located outside of the USA, each such recited function is intended to mean the function of combining, in a logical manner, the information of that claim limitation with at least one other limitation of the claim. For example, in client-server systems where certain information claimed under 35 USC §112 (6) is/(are) dependent on one or more remote servers located outside the USA, it is intended that each such recited function under 35 USC §112 (6) is to be interpreted as the function of the local system receiving the remotely generated information required by a locally implemented claim limitation, wherein the structures and or steps which enable, and breath life into the expression of such functions claimed under 35 USC §112 (6) are the corresponding steps and/or means located within the jurisdiction of the USA that receive and deliver that information to the client (e.g., without limitation, client-side processing and transmission networks in the USA). When this application is prosecuted or patented under a jurisdiction other than the USA, then "USA" in the foregoing should be replaced with the pertinent country or countries or legal organization(s) having enforceable patent infringement jurisdiction over the present application, and "35 USC §112 (6)" should be replaced with the closest corresponding statute in the patent laws of such pertinent country or countries or legal organization(s).

All the features disclosed in this specification, including any accompanying abstract and drawings, may be replaced by alternative features serving the same, equivalent or similar purpose, unless expressly stated otherwise. Thus, unless expressly stated otherwise, each feature disclosed is one example only of a generic series of equivalent or similar features.

Having fully described at least one embodiment of the present invention, other equivalent or alternative methods of an identity system according to the present invention will be apparent to those skilled in the art. The invention has been described above by way of illustration, and the specific embodiments disclosed are not intended to limit the invention to the particular forms disclosed. For example, the particular implementation of the GUIs may vary depending upon the particular type of computing device used. The computing devices described in the foregoing were directed to smartphone implementations; however, similar techniques using laptop computing implementations of the present invention are contemplated as within the scope of the present invention. The invention is thus to cover all modifications, equivalents, and alternatives falling within the spirit and scope of the following claims.

Claim elements and steps herein may have been numbered and/or lettered solely as an aid in readability and understanding. Any such numbering and lettering in itself is not intended to and should not be taken to indicate the ordering of elements and/or steps in the claims.

What is claimed is:

1. A system comprising:
    a control device being configured to be at least operable for communicating over one or more networks and to other control devices, said control device being further configured to be operable for executing program applications and displaying outputs from said applications to a user;
    at least one server being configured to be at least operable for communicating over at least one network to said control device and to other control devices, said server at least comprising a personal identity model, a personal identity engine and a personal identity controller, said personal identity model at least being configured to be operable for collecting user information of the user and for storing said user information, said user information at least comprising personal information, personality information, and biometric information, said personal identity engine at least being configured to be operable for processing said stored user information to produce a digital token, said personal identity controller at least being configured to be operable for managing exchange of said digital token in a user identity verification process;
    at least one claim point at least being configured to be operable for exchanging said digital token with said server in said user identity verification process in which upon verification of the users identity, said claim point provides a service to the user; and
    a select/mix processing component configured to process the personal information, the personality information, and the biometric information to generate an encrypted token for personal identification, wherein the select/mix processing component further comprises:
        a. a core attributes portion;
        b. a core pattern portion;
        c. a core pattern selection portion;
        d. a selected core attribute portion;
        e. a contextual attributes portion;
        f. a contextual pattern portion;
        g. a contextual pattern selection portion;
        h. a selected contextual attribute portion;
        i. a traits/alios portion;
        j. a mix portion; and
        k. an attributes/traits processing portion;
    wherein the attributes/traits processing portion receives information from the personal identity model, the core attributes portion receives information from the attributes/traits processing portion, the contextual attributes portion receives information from the attributes/traits processing portion, the traits/alios portion receives information from the attributes/traits processing portion, such that a random core pattern portion is selected from a core pattern selection portion, such that the selected core pattern is applied to the core attributes portion, to generate the selected core attributes portion, such that a random contextual pattern portion is selected from a contextual pattern selection portion, the selected contextual pattern is applied to the contextual attributes portion to generate the selected contextual attributes portion, such that the mix portion receives information from the selected contextual attribute portion, from the selected core attribute portion, and from the traits/alios portion, such that the mix portion groups all these attributes in a special string of digital data to form a digital token;
    in which said personal identity model is further configured to be operable for learning data from said personality information for storage in said user information.

2. The system as recited in claim 1, in which said personal identity model is further configured to be operable for deriving data from said personality information for storage in said user information.

3. The system as recited in claim 2, in which said user information is at least grouped as core attributes and contextual attributes.

4. The system as recited in claim 3, in which said user information is further segregated into traits.

5. The system as recited in claim 4, in which said personal identity engine compares said core attributes to a selected core pattern to select a random core attribute for said digital token.

6. The system as recited in claim 5, in which said personal identity engine compares said contextual attributes to a selected contextual pattern to select a random contextual attribute for said digital token.

7. The system as recited in claim 6, in which said personal identity engine mixes said selected core attribute, said selected contextual attribute and at least one trait for said digital token.

8. The system as recited in claim 7, in which said selected core pattern and said selected contextual pattern are randomly selected.

9. The system of claim 1, wherein the select/mix processing component further comprises a hash portion, wherein the hash portion receives the digital token from the mix portion, and the hash portion encrypts the digital token to form an encrypted token.

10. The system of claim 9, wherein the select/mix processing component further comprises an encrypted token portion, such that the encrypted token portion receives the encrypted token from the hash portion.

11. The system of claim 10, wherein the select/mix processing component further comprises a timeout portion, wherein the timeout portion wakes up on fixed time intervals to remove unused personal identity tokens from the encrypted token portion.

12. The system of claim 4, wherein the traits further comprise:
    extraversion, openness, emotional stability, conscientiousness, and agreeableness.

* * * * *